United States Patent [19]

Tung

[11] Patent Number: 4,847,641

[45] Date of Patent: Jul. 11, 1989

[54] PIECE-WISE PRINT IMAGE ENHANCEMENT FOR DOT MATRIX PRINTERS

[75] Inventor: Charles Cheng-Yuan Tung, Boise, Id.

[73] Assignee: Hewlett-Packard Company, Palo Alto, Calif.

[21] Appl. No.: 232,814

[22] Filed: Aug. 16, 1988

[51] Int. Cl.$^4$ ............................................. G01H 15/00
[52] U.S. Cl. ..................................... 346/154; 346/160
[58] Field of Search .................. 346/154, 160, 107 R, 346/108, 160.1; 364/518–521; 400/119; 350/332, 333

[56] References Cited

U.S. PATENT DOCUMENTS 4,715,006 12/1987 Nagata ................................. 346/154
4,786,923 11/1988 Shimizu ............................... 346/154

Primary Examiner—Arthur G. Evans
Attorney, Agent, or Firm—Leslie G. Murray

[57] ABSTRACT

Print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

12 Claims, 17 Drawing Sheets

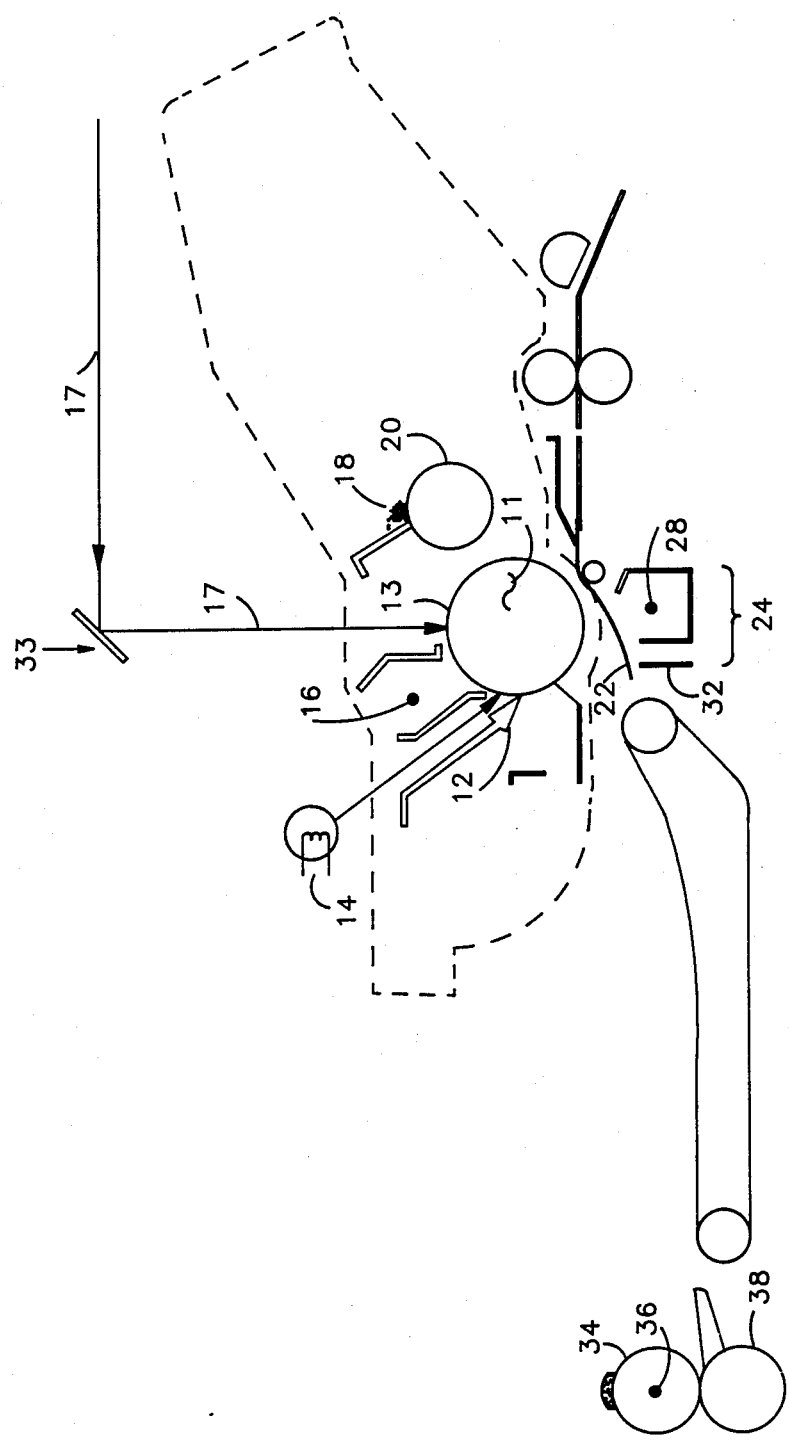

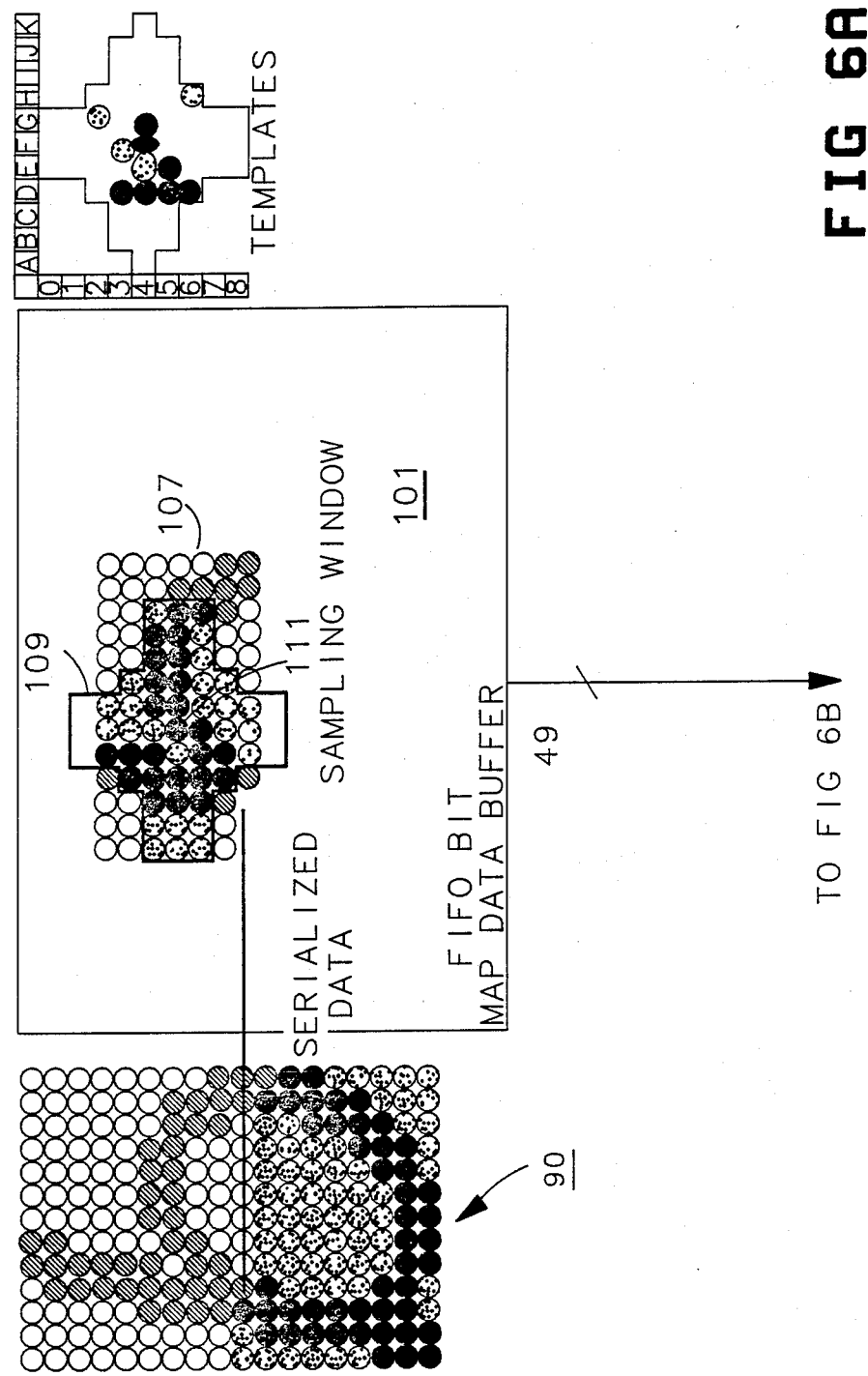

PIECE-WISE PRINT IMAGE ENHANCEMENT FOR DOT MATRIX PRINTERS

BACKGROUND OF THE INVENTION

The present invention relates to print image enhancement techniques used in dot matrix printing machines, such as electrophotographic printing machines, and, more specifically, relates to matching standard digitized bit maps on a cell-by-cell basis (piece-wise) with prestored, predetermined patterns to provide compensating print signals to produce a synthetic, high resolution enhanced printed image.

Typically, non-impact printing machines are designed to create a printed image by printing a series of pictures elements, pixels or dots, on a print medium, such as paper. In electrophotographic printing machines, laser printers for example, a desired image may be created by a light source which is caused to scan across the charged surface of photosensitive material in a secession of scan lines. Each scan line is divided into pixel areas and the light or laser beam is modulated such that some pixel areas are exposed to light and some are not resulting in a predetermined series or pattern of overlapping pixels on each scan line. Wherever a pixel area is illuminated by the laser beam the photosensitive material is discharged. In that manner, the photosensitive material is caused to bear a charge pattern of pixels which images the subject that is being printed or reproduced. The printed copy is then obtained by developing the charged pattern and transferring the developed image to the print media.

The printed image produced by a dot matrix printer is a digitized or quantized image, sometimes referred to as a bit map image, of a desired analog image. An analog image cannot be exactly represented by a digital bit map image. The components of a analog image may be continuous in any orientation, while those of a bit map image must precede in orthogonal, incremental steps. This constraint results in distortion in the bit map representation of an analog image. The bit map image typically consists of a large number of discrete pixels or dots organized in a predetermined (spatial) pattern. Each dot has characteristics such as location coordinates, intensity, color and size. Each characteristic is independent of the other characteristics and can be viewed as an independent dimension.

The resolution of the bit map images produced by dot matrix printing machines is typically stated in the number of pixels or dots printed per inch. For example, a 300 dot per inch (dpi) printer has a higher resolution than a 240 dpi printer. A printer which produces 300 dpi in the horizontal row direction and 300 dpi in the vertical column direction has a 300 by 300 dpi resolution. At a resolution of 300 by 300 dpi lines printed parallel or perpendicular to the scan direction print with very little visible distortion. However, diagonal lines and boundaries between different regions of printer dots produce jagged steps or staircase distortion which is quite visible to the human eye.

Distortion in bit map representations is a consequence of low resolution of the bit map or low sampling rates of the desired analog image. A typical approach to reducing this distortion has been to increase the resolution of the bit map image by increasing the number of dots in a fixed size image, i.e., reducing the dot size, which increases the spatial resolution. Increasing the resolution reduces the size of the step distortions as well as preserving much fine detail which is lost at lower resolution. However, increasing the resolution is expensive. The amount of data to be processed and stored is proportional to the number of pixels or cells in the bit map. For example, doubling the resolution of a 300 by 300 dpi two-dimensional bit map results in a 600 by 600 dpi bit map which requires 4 times more memory and processing power. Further, a bit map image output device, cathode ray tube (CRT) or printer, for example, capable of displaying this higher resolution image must be used which may further increase the cost. If it is required to enhance the resolution on intensity level or colors as well, the cost will be further increased. While this solution has been used in many more sophisticated, high end printers, it is not a practical solution for lower cost, low end printers.

A second approach to reducing distortion caused by the digitization process utilizes interpolation techniques, to either link the outstanding corners of a jagged edge into a continuous slope or to average the intensity of neighboring dots and blur the jagged edge. While simple interpolation methods smooth the jagged or stairstep edges producing results generally more acceptable than straight forward bit map images, they have many side affects which are no less distracting than the original odd harmonic noise introduced by digitizing. For example, the gray scale anti-aliasing method blurs and smoothes the jagged edge transitions, but sacrifices contrast. The sharp features are averaged and smoothed, but many detailed features are also filtered out. In other words, the interpolation linking process causes additional data loss after the initial data loss due to the bit map conversion, digitalization, process.

U.S. Pat. No. 4,625,222 issued to Bassetti et al on Nov. 25, 1986 entitled, "Interacting Print Enhancement Techniques" discloses a technique for smoothing digitized staircase effects with a technique known as fine line broadening. To perform the smoothing gray are produced along both edges of a slanted line adjacent the black dots which form the slanted line. For the broadening function, gray dots are added directly adjacent black dots in a dimension parallel to the scan direction while in a dimension perpendicular to the scan direction expanded black dots are produced. In combining the smoothing and broadening print enhancement techniques, various interactions are considered and enhanced dot producing signals are inhibited in some cases. U.S. Pat. No. 4,544,264 issued to Bassetti et al on Oct. 1, 1985 entitled, "Fine Line Print Enhancement" discloses techniques for enhancing the printing of fine lines in a direction parallel to the printer scan direction by providing a gray dot adjacent to the black dot on at least one side of the line. For fine lines in a direction perpendicular to the scan direction, the line is broadened by increasing the time period for dot modulation a predetermined amount greater than the normal dot. Thereby adding to the size of or broadening the line. Circuits are described which implement the print enhancement techniques and which are interposed between the character generator and the printer laser printhead. The print enhancement techniques disclosed in the above U.S. patents comprise line broadening techniques producing images in which the sharp edge features are not clearly defined with loss of fine detail.

U.S. Pat. No. 4,544,922 issued to Watanabe et al on Oct. 1, 1985 entitled, "Smoothing Circuit For Display Apparatus" discloses a smoothing technique comprising the seleced addition or removal to or from particular portions of a dot pattern, of a small dot having a width ⅓ of the standard dot width. A smoothing circuit for a display apparatus is disclosed comprising memory means for memorizing data composed of selected standard width dots of a dot matrix representative of a character to be displayed and logical operation circuit means responsive to the data for performing logical operations thereon which satisfy predetermined conditions so as to selectively alter the data in correspondence with the addition or removal in the matrix position being considered of a small dot having a width ⅓ of the standard dot width. The selectively altered data presents the desired character with relatively smooth contours.

In more recent applications pattern recognition or template matching processes have been implemented. In these techniques template matching is implemented as a weighted matrix operator which is multiplied through every position of an arbitrary bit map image to provide a correlation of factors between the bit map image and the compared template or pattern. These complex matrix calculations can produce printed images with crisp contrast, clearly defined images and expanded dynamic range. Background noise (space invariant) can be selectively eliminated without loss of the detailed image features. However, this complex process is slow, hardware intensive and very costly which limits its applications to remotely sensed image processing used by the military or space research organizations.

SUMMARY OF THE INVENTION

The present invention provides a technique for enhancing the printing of bit mapped images by piecewise matching of the bit map with predetermined stored templates or patterns to detect occurrence of preselected bit map features. Whenever a match occurs an error signal is generated to produce a corrected or compensated dot or cell to replace the matched bit map cell. In this manner the printed image of the desired bit map image is enhanced by substituting in the original bit map image on a piece-by-piece or cell-by-cell basis, the cells of the preselected feature with error compensated subcells. Empirically derived bit patterns or templates representing compound error elements that are common to all bit map images, the associated compensation signals for each template and the rules governing the relationships between the matched templates and their associated compensation signals are compiled into an index matching table implemented in a high speed parallel logic array.

The print enhancement techniques of the present invention are implemented in circuitry interposed between the character generator circuitry (formatter) and the printing mechanism of a non-impact printer, such as the scanning laser of a laser beam printer. The bit map image data generated by the character generator is serialized and input to a first-in-first-out (FIFO) data buffer. A fixed subset of the FIFO buffer storage cells form a sampling window through which a selected block of bit map image data is viewed. As serialized data continues to shift through the buffer, the window views successive bit patterns formed by bit map cells located at the window center cell and their surrounding neighbor cells. Each bit of data representing a bit map image cell will pass through the window several times in different positions until it reaches the center cell position. Each bit pattern formed by a bit occupying the center cell and its neighboring bits is passed through a matching network. An associated compensation subcell will be substituted for the bit occupying the center cell if the matching network finds one or more template matches; otherwise the center bit will appear at the output unchanged. All templates which generate the same compensation subcell when matched are OR'd together. Thus, if any one template in the OR'd group matches with the sample window bit pattern, the associated compensation subcell output will be activated. An output controller (compensation subcell generator) passes the unmodified center cell or the compensation subcell, if a match has been detected by the matching logic network, to the output to be coupled to the laser control circuitry. The compensation subcells produce a printed dot which has a smaller size than a standard, unmodified bit map dot. With the use of horizontal and vertical correction techniques on the laser beam printer, horizontal and vertical dot increments smaller than the unmodified dot size are possible. The output controller generates the pulse modulation signals required for the laser to print the modified dots associated with the compensation subcells. The use of this technique produces a printed output having an effective higher resolution in the immediate area of the correction than that of the bit map image as originally generated.

This piece-wise technique of image enhancement, implemented through template matching, allows independent testing and compensation of each bit map cell, yet preserves the correlation between the cells. This process takes advantage of the fault tolerant nature of bit map images and consistency of round off errors characteristic of bit map images. Thus a succession of independently compensated error cells will integrate to form a continuous, compensated compound error element. This approach not only allows unique and more flexible template set development and expansion to include special cases, but reduces highly complex, multi-pass image processing calculations to a relatively simple, repeatable and pre-assigned matching process executed through a high speed index matching table implemented in simple parallel real time hardware. In comparison to other techniques for bit map image print quality improvement, the piece-wise matching process of the present invention yields precise quality improvement without large increases in memory space and image processing power.

BRIEF DESCRIPTION OF THE DRAWINGS

FIG. 1a is a block diagram of a typical electrophotographic printing machine.

FIG. 1b is a diagram illustrating the solid state laser apparatus and the associated control circuitry for producing a scanning laser beam for the machine shown in FIG. 1a.

FIG. 1c is a diagram illustrating the write process on a photosensitive drum for the machine shown in FIG. 1a.

FIG. 6a and 6b are a block diagram representing the enhancement circuitry of the present invention.

DETAILED DESCRIPTION OF A PREFERRED EMBODIMENT

The present invention is described as applied to a electrographic printer, such as a laser beam printer, although it is to be understood that the present invention is compatible with other dot matrix display devices such as thermal ink jet printers and cathode ray tubes (CRT). In dot matrix printers, each character is comprised of a matrix of cells, dots being filled in cells and blanks being empty cells which together define the desired character. The dots and blanks are arranged in a matrix of positions that are typically arranged in horizontal rows and vertical columns that are adjacent, parallel and evenly spaced. The intersections of the rows and columns determine the locations of the cells, dots and blanks. The cells may overlap, depending upon the spacing between matrix intersections and cell diameter Each matrix cell is represented in the apparatus by a binary data element with a binary one typically representing a dot, a filled cell, and a binary zero representing a blank, an empty cell. Data stored in the apparatus and representing one or more desired characters or character sets are typically known as bit maps or bit mapped images. Such bit maps may be characterized as digital representations of an analog characters.

In an electrophotographic printing machines, such as a laser beam printer, printing is produced by creating an electrostatic representation of the desired image on a photoreceptive surface, developing the image and then fusing the image to a print media such as paper. Printing on a laser beam printer requires the interaction of several different technologies to provide a page of printed output. In printers which utilize plain bond paper or other image receiving media not coated with photoreceptive material, the printing process is centered around the image formation on a rotating photosensitive drum.

Figure 1C:
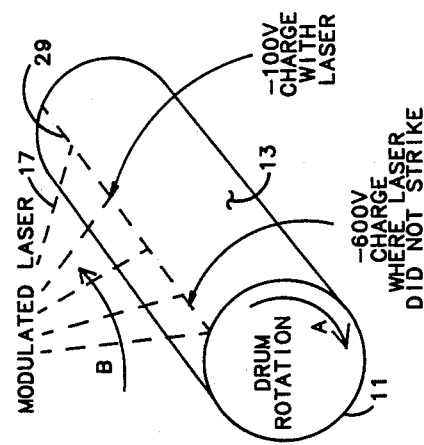
Figure 1B:
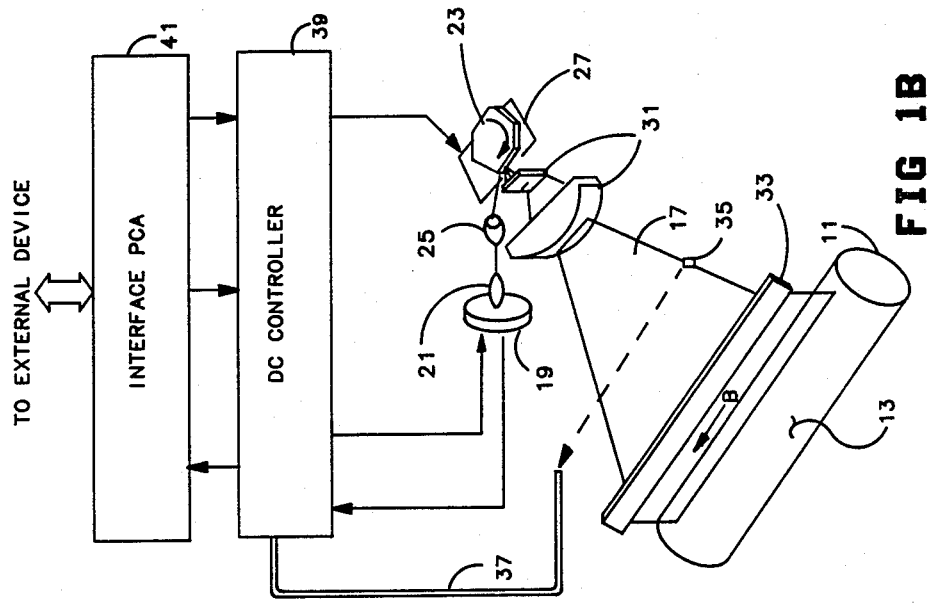

Referring now to FIGS. 1a, 1b and 1c, block diagrams illustrating a typical electrophotographic laser beam printing machine are shown. A photosensitive drum 11 is driven by a motor (not shown) in direction A. The drum 11 is a metal cylinder, such as extruded aluminum, typically coated with a layer of organic photoconductive material. During the printing process, the drum 11 is constantly rotating and may make several complete rotations per printed page. Prior to forming the image for a given section of print, the drum's electrostatic surface 13 must be prepared to hold the desired electrostatic image by physically and electrostatically cleaning the drum. Physical cleaning is accomplished by a rubber cleaning blade 12 which scrapes any toner remaining from a previous cycle off the drum 11 and into a debris cavity. The drum 11 is then electrostatically cleaned by erase lamps 14 which illuminate the photosensitive material of the drum to neutralize any electrical charges which may have previously been on the drum 11. The cleaned surface 13 of the electrostatic drum 11 is then conditioned by the application of a uniform negative charge. The rotating drum 11 passes the photosensitive material through an ionized region created by a charge corona generator 16 in which negative charges migrate from the corona generator 16 to the surface of the drum 11. After rotating past the charge corona generator 16, the drum 11 has a uniform negative 600 volt potential on its surface 13. During writing, a laser beam 17 is utilized to discharge the drum 11 surface potential in selected areas by focusing the laser light on selected portions of the photoconductive drum surface 13. In this manner an electrostatic image is created which is later developed into a visible image and transferred to the print media.

The laser beam 17 is produced by a solid state laser 19 which is turned on and off by simply supplying or denying power. The laser light produced by the diode 19 is collimated into a well-defined beam by collimator lens 21 and focused onto a scanning mirror 23 by cylindrical lens 25. The scanning mirror 23 is a sixsided rotating polygon mirror which is rotated at constant speed by the scanner motor 27. As the scanning mirror 23 rotates the laser beam 17 sweeps in an arching direction as indicated by arrow B. The sweeping laser beam 17 is focused on a horizontal line 29 on the photosensitive surface 13 of the drum 11 by the focusing lens 31 and mirror 33.

As the laser beam 17 sweeps the length of the drum 11 in direction B and because the drum is rotating in direction A, the entire surface 13 of the drum is covered with a raster image. The speed of the scanner motor 27 which rotates the scanning mirror 23 and the speed of the main motor which rotates the drum 11 are synchronized so that each successive sweep of the laser beam 17 is off set on the surface of the drum 11 by 1/300 of an inch. The laser 19 can also be turned on and off thereby modulating the laser beam 17 at such a rate as to place a dot of light every 1/300 of an inch in the horizontal direction along line 29 thereby achieving a 300 by 300 dots per inch (dpi) resolution. At the beginning of each sweep prior to the laser beam reaching the drum 11, the laser beam 17 is reflected off a beam detector mirror 35 into an optical fiber 37. This momentary pulse of light is transmitted through the optical fiber 37 to the DC controller 39 where it is converted to an electrical signal used to synchronized the output of data for one sweep (scan line) with the rest of the data and for other printer control and test functions.

After writing, the drum 11 has an invisible electrostatic latent image on its photosensitive surface 13. The portions of the drum surface 13 that were not exposed to the laser beam 17 are still at the negative 600 volt potential, but those portions exposed to the laser light have now been discharged to approximately negative 100 volts. After writing, the electrostatic image is developed into a visible image on the drum surface 13.

At the developing station, developing material called toner 18 is placed on the electrostatic image. The toner material is a powdery substance made of black plastic resin bound to iron particles. The iron in the toner causes an attraction of the toner to a metallic rotating cylinder 20 having a permanent magnet (not shown) running the length of the cylinder. The plastic toner particles 18 obtain a negative surface charge by rubbing against the cylinder 20 which is connected to a negative DC supply. This electrostatic charge obtained by the toner is such that the toner particles 18 are attracted to the areas of the drum surface 13 which have been exposed to the laser light and repelled from the surface areas not exposed.

At the transfer station 24 the toner image on the drum surface 13 is transferred to the print paper 22. The print paper 22, which is traveling at the same speed as that of the surface of the drum 11 contacts the surface of the drum. A corona assembly 28 produces positive charges which deposit on the back surface of the paper 22. The stronger positive charges on the paper pull the negative charged toner particles 18 off the surface of the drum 11. A static charge eliminator 32 weakens the attractive forces between the negatively charged drum surface 13 and the positively charged paper 22 to prevent the paper 22 from wrapping around the drum 11. From the transfer station the print paper 22 moves to the fusing station 26 and the drum 11 rotates to the cleaning station to prepare it to receive the next section of print.

At the fusing station 26 the toner is melted and forced into the print paper by heat and pressure to produce a permanent printed image. The fusing station 26 comprises a non-stick heat roller 34 that is heated internally by a high intensity lamp 36 and a soft pressure roller 38 that slightly compresses when pressure is applied to provide a large contact area between the paper and the upper heat or fusing roller 34. At this point the toner 18 deposited on the paper 22 is melted and squeezed into the paper fibers.

The DC controller printed circuit assembly (PCA) 39 is the printer control system and is responsible for coordinating all activities involved in the printing process. The DC controller 39 provides the control signals which drive the laser beam 17, coordinating dot pattern data from the interface PCA 41 with paper size, sensitivity and laser beam motion information.

Figure 5:
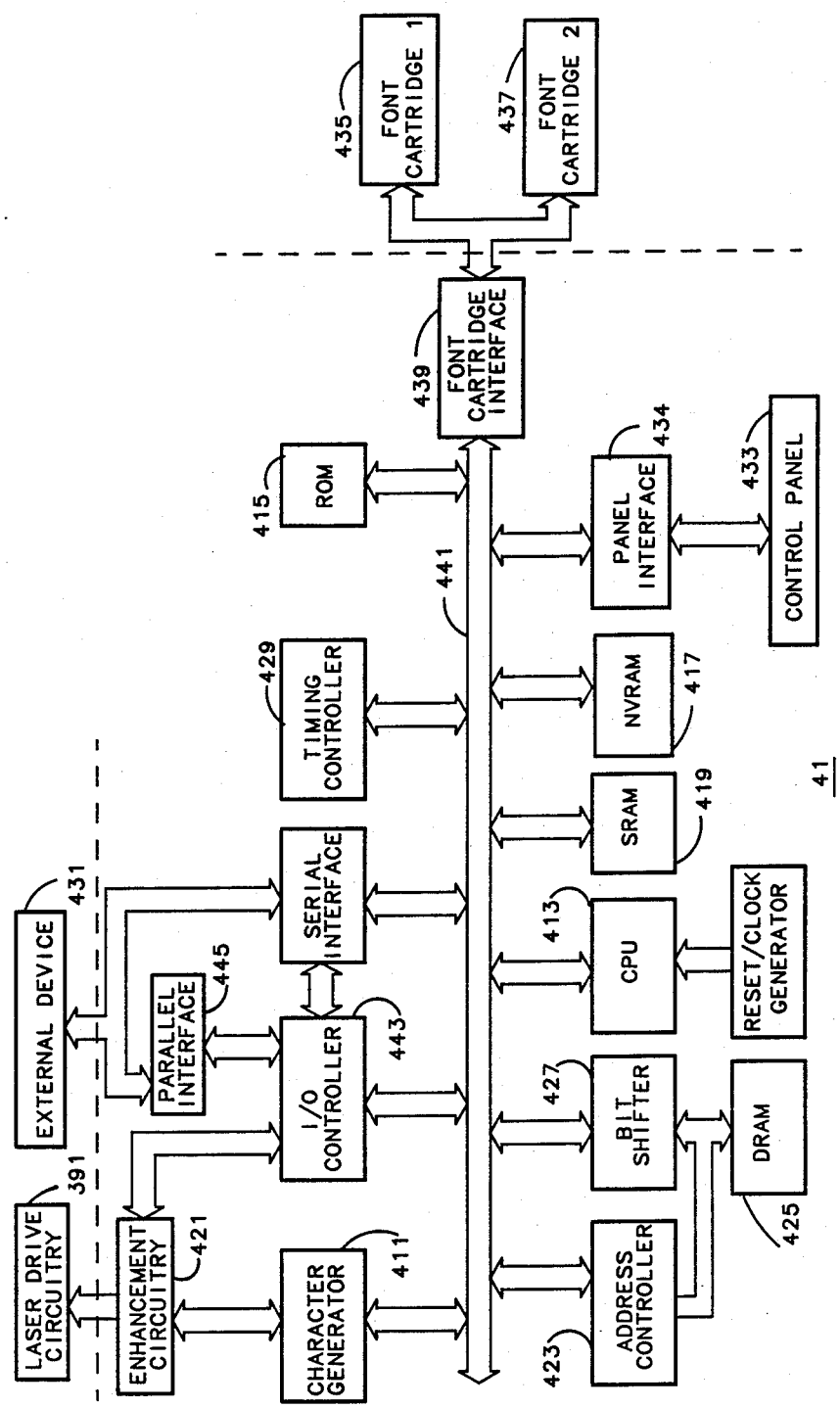
FIG. 5 is a block diagram of the Interface PCA of FIG. 1a showing the position of the enhancement circuitry in accordance with the present invention.

The interface PCA 41 includes a central processing unit (CPU) that controls the operation of the interface PCA 41 and a block of read only memory (ROM) for storing the dot patterns or bit map images of desired character sets. Additional bit map image data may be provided in add on ROM cartridges. The interface PCA 41 is responsible for correct communication between the printer and external devices 431, such as a personal computer, established by configuration settings selected at the printer control panel 433 (as shown in FIG. 5). Coded data from the external device 431 is then processed according to the control panel 433 settings or printer commands and is converted to dot data for modulating the laser beam 17.

As described hereinabove, the actual data or bit map images for the desired characters and graphics are stored in memory (ROM) in the interface PCA 41 with additional character sets provided by add on ROM (plug in) font cartridges. Video circuitry included in the interface PCA 41 converts the character and graphics data, bit map images, to dot data which is output to the DC controller to drive the laser 19. To compensate for the errors produced in the process of converting the analog characters to digital bit maps these video signals are modified by correction or compensation signals where required.

Figure 2:
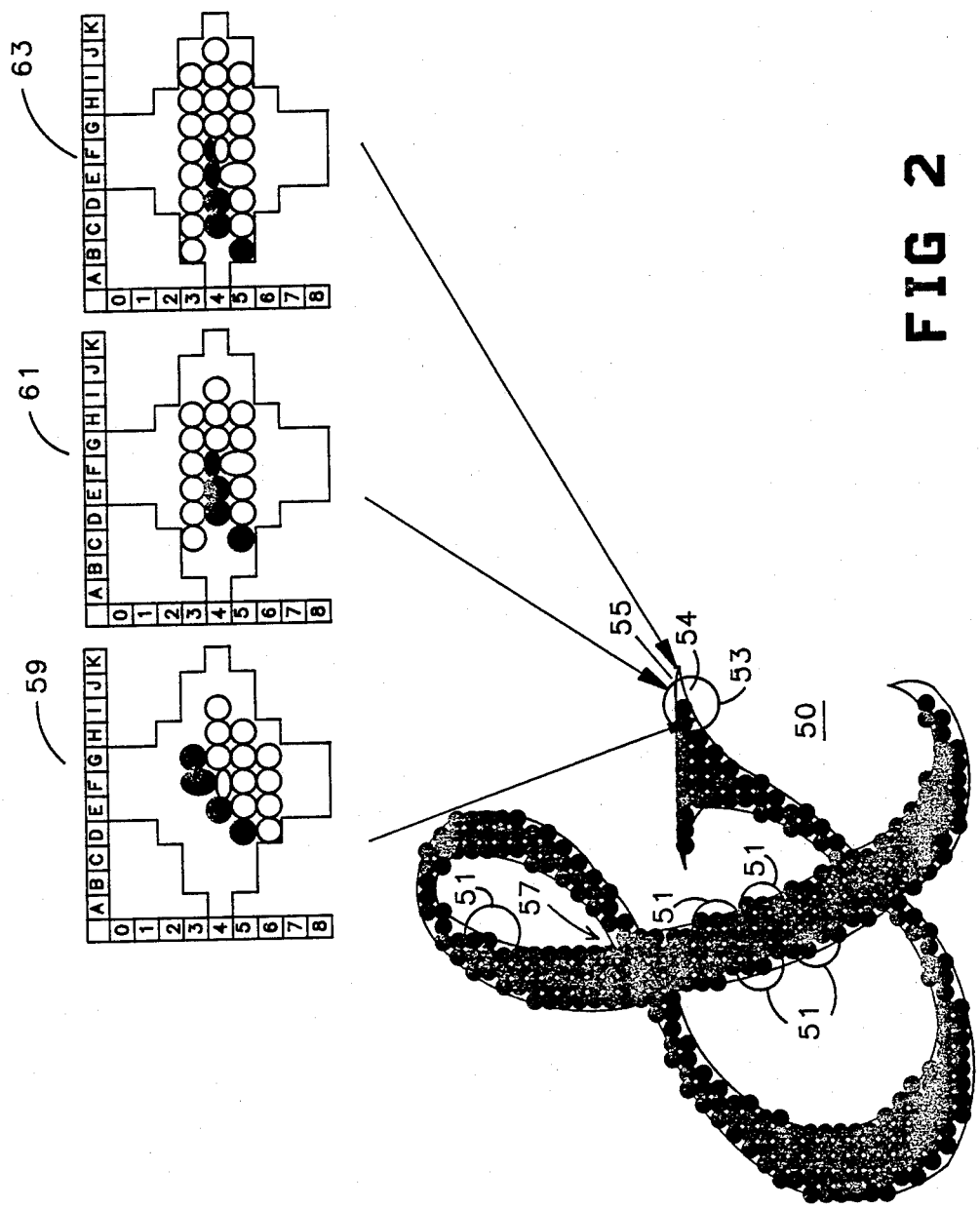
FIG. 2 a diagrammatical representation of a bit map image for the character "&" illustrating the design of pattern matching templates of the present invention.
Figure 3:
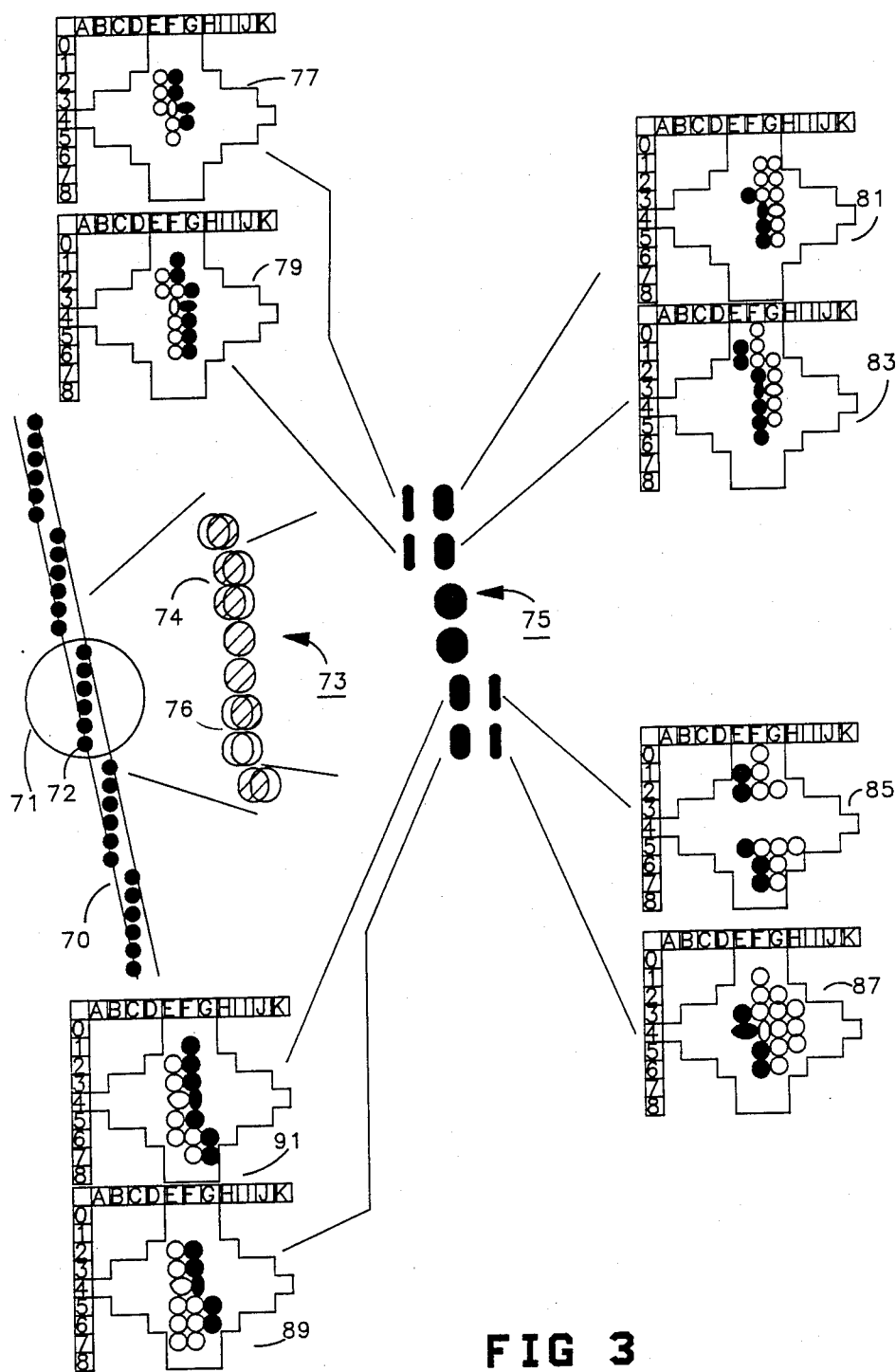
FIG. 3 is a diagrammatical representation of a vertically slanted straight line illustrating the design of pattern matching templates and compensation subcells generated by the matching templates of the present invention.
Figure 4:
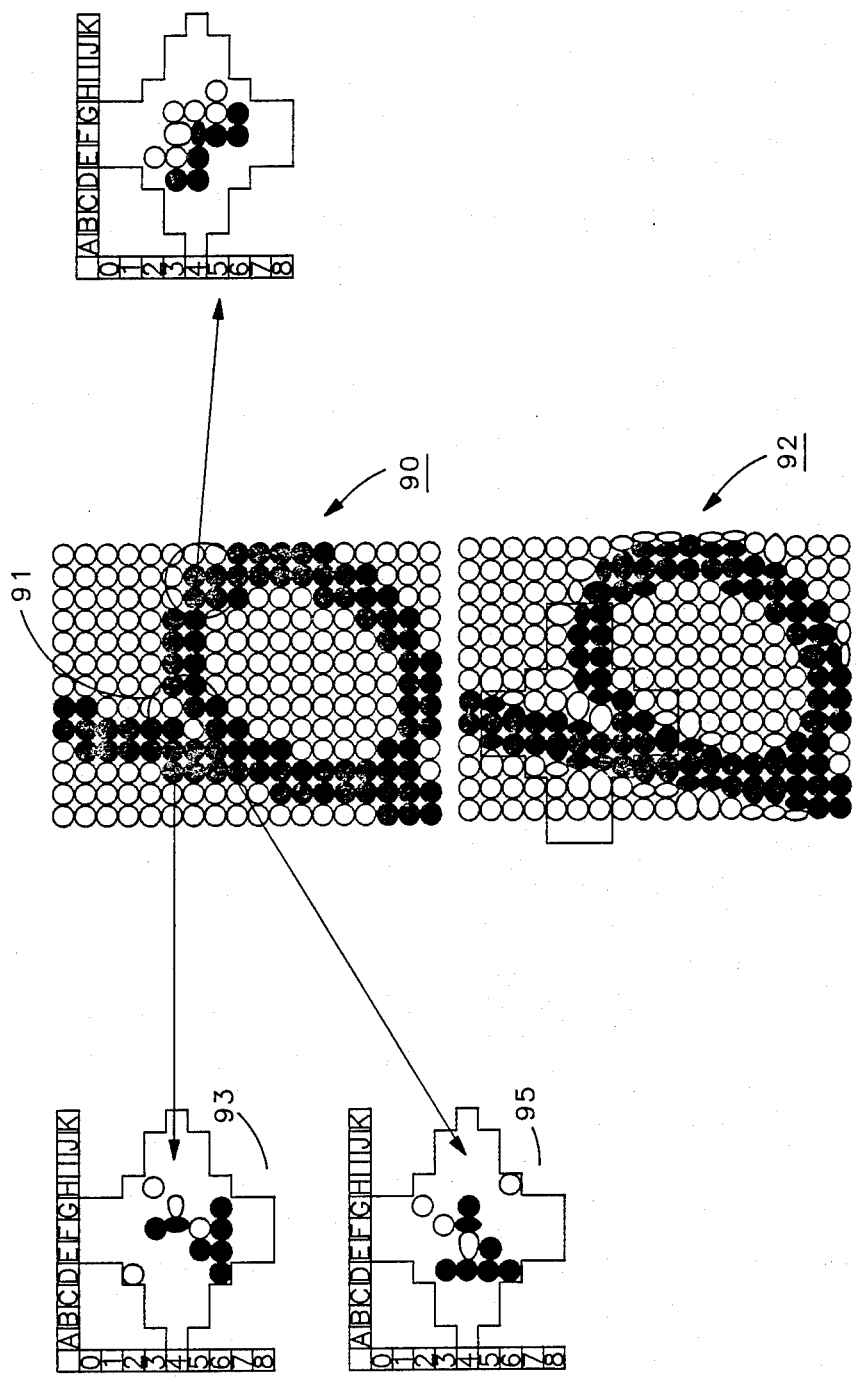
FIG. 4 is a diagrammatical representation of a bit map image of the lower case italic letter "b" illustrating the design of pattern matching templates and the resulting enhancement of the letter.

Referring now to FIGS. 2, 3 and 4, every bit map image such as the character "&" 50 shown in FIG. 2, the slanted straight line 70 shown in FIG. 3 and the italic letter "b" shown in FIG. 4, can be broken down into many small pieces such as the stepped vertical edge marked by circles 51. Since each of these stepped edge errors comprise three vertical dots it may be thought of as a 3:1 compound error element. These three to one compound 3:1 elements may repeat many times and have eight possible orientations which are symmetrical to each other. A second example of a 3:1 compound error element is the group of three horizontal dots shown at circle 53 and forming the horizontal tip of the character "&". These compound error elements may be portions of a smooth edge curve, circles 51, or a portion of a sharp tip, circle 53, or other portions of any arbitrary bit map image. These compound error elements are the fundamental building blocks for all bit map images. They may have other special forms such as 2:2, 5:1, or 6:1 as shown in FIG. 3 at 71. All bit map images are composed from a finite set of these compound error elements. The different compound error elements are categorized by type such as edge twist, tip, round off, not filled valley or hills squared. A single compound error element may cover an edge boundary over a length ranging from a single segment (the dimension of a matrix cell or dot) to twenty consecutive segments. Compound error elements with multiple segments may be further broken down into smaller pieces.

The vertical slanted line 70 is composed of a plurality of vertically oriented six-segment long compound error elements, each one placed immediately below and one matrix cell to the right of the one above it. Each compound error element 71 has 6 edge cells; the center two error cells have low round off error and require no modification, while each dot in the pairs of dots on each end of compound error element 71 require modification to smooth the stairstep slanted line 70. The modifications required for dot or error cell 72, for example, are to remove or cut a portion from the left side of dot 72 and add or fill (i.e., fill in a portion of the adjacent blank cell) on the right side of dot 72. Compound error element 73 is compound error element 71 expanded to illustrate the modifications made to each dot or error cell of the compound error element 71. A modification to the error cell 72 which fills in on one side or the other of the error cell in reality is filling in a portion of the blank or empty cell immediately adjacent the error cell 72. The smoothing compensation for compound error element 71 requires eight separate corrections, a cut and a fill correction for each error cell in the pairs at the upper and lower ends of compound error element 71. Eight pattern matching templates 77, 79, 81, 83, 85, 87, 89 and 91 are required to detect the unique error cell organization or pattern which occurs for each segment with round off error. Compound error element 75 is an expanded view of compound error element 73 illustrating the fill and cut corrections for each error cell of compound error element 71. Templates 77, 79, 85, and 87 provide a fill modification while templates 81, 83, 89, and 91 provided a cut modification. As shown in compound error element 73, when printed the result is that the top pair of dots 74 have been shifted slightly to the left and bottom pair of dots 76 have been shifted slightly to the right thereby smoothing the staircase effect of slanted line 70. As seen from this example, each dot or error cell of a compound error element is matched against the set of templates to determine the appropriate modification which may be required.

Each of the pattern matching templates matches a unique bit map signature of a digitalization error and has been assigned an appropriate compensation subcell which is associated with a compensation or correction signal. Since the matching templates for a compound error occur in secession, the compensation subcells assigned to these templates are designed to join together. A group of these templates which is associated with a particular compensation correction signal is mutually exclusive to any other group of templates. A random bit map pattern may match many templates, but they are all in the same group and will provide the same compensation signal. Each of these fundamental cases which match templates are called error cell components or error cells.

The enhancement technique of the present invention utilizes a hierarchical approach to bit map images; at the top level is the bit map image itself which is comprised of compound error elements. The compound error elements in turn are comprised of error cell components. Each error cell component has its assigned compensation subcell. All error cells which may neighbor others are assigned compensation subcells which join smoothly together. These error cells are mutually and exclusively grouped based on their associated compensation subcells. The complex procedure of reduction from bit map images to compound error elements to error cell components and assignment of the appropriate compensation subcell to each error cell component is completed with the design of the matching template. These complex multi-staged decisions are further simplified into a table index matching operation which is implemented by hardware in real time. Since error cell elements are independent components of the image distortion, the templates derived from one particular compound error element may be the same as templates derived from another compound error element and will provide the same compensation which greatly reduces the complexity of the template index matching table.

Each error cell component is independent of all compound error elements. All possible joint relations which are the inner dependence constraint of a compensation subcell are already imbedded in the final matching template specification. If a bit map pattern matches all the requirements of a template the decision can be made to provide compensation without knowing that the cell is part of a curve, slope or notch compound error element or what compensation subcells have been assigned to its neighboring cells. The design of the matching templates guarantees that adjacent error cells will have assigned matching compensation subcells. The template matching process for a complete bit map image can be accomplished piece-wise, i.e., cell-by-cell from right to left, from top to bottom, or in any random sequence and still have the same result.

Each template has only one central error cell and associated compensation subcell, but it may have as many arbitrarily defined matching bit map pattern cells as the sample size will allow. This allows bit pattern specification cells to be easily added, removed or changed in an existing templates to modify or to form additional templates which can select or exclude a special subset of cases. This flexibility allows the development of templates to handle exceptional compound error elements. Special bit map image features or characteristics that may require unique compensation or place restrictions on compensations are considered as exceptional cases.

In addition to smooth edge curves, sharp tips and notches are another common feature found in the original analog image. During the digitalization process, tips are clipped and notches are filled when their widths narrow to less than one cell length. The resulting bit map images have distinguishable signatures which can be detected and compensated for by using a group of specially designed templates. A set of templates 59, 61 and 63 used to detect and restore black region tips as illustrated at 55 are shown in FIG. 2. Template 61 will detect a tip end compound error element 53 where two edges intersect at an acute angle. In this case, the geographic round off error is, on the average, a positive 25% in the error cell 54. The compensation subcell assigned to this template 61 will therefore cut the error cell 54 area, retracting the error cell edge in a direction determined by the extrapolated direction trend of the tip 55. When a sample window moves to the right one more cell position, its center is located on the error cell immediately adjacent error cell 54. This error cell is empty or blank. The geographic round off error for this cell is, on the average, negative 25% thus a fill compensation subcell is assigned to template 63 resulting in a fill correction in the extrapolated direction of the tip 55.

A sharp notch 57 or 91 in a black region of the original analog image can be viewed as a sharp tip in the adjacent white region. However, due to the characteristics of a laser beam printer which deposits black toner on white paper, white region tips are not compensated in the same manner as black region tips because a narrow white region can be overlapped and filled by the adjacent black regions. Bit map image generation may not anticipate and cannot compensate for this effect. Many bit map image formations contain white cells, i.e., blank or empty cells that are surrounded by a number of black cells or dots, the notch 91 in the "b" 90 (as shown in FIG. 4) which cannot be printed properly. Templates 93 and 95 are designed to cut back the surrounding black region in these cases to restore the black notches, i.e., white tips, to their predicted desired shape. In a manner similar to that described above for a black tip 55, white tips can be extended or extrapolated resulting in a more accurate presentation of the desired analog image.

The implementation of the template matching enhancement technique described above is, at least in part, determined by the display device or printing machine the technique is to be used with. Different output devices may require different compensation techniques. The laser printer described hereinabove is a bi-level, two dimensional raster image output device in which each cell has a one bit (black/white) parameter. The solid state laser 19 is driven by a single, serial data modulation signal (video) provided to the DC controller 39 by the interface PCA 41.

FIG. 5 is a block diagram of the laser beam printer interface PCA 41 showing the position of circuit components to enhance the printed image according to the present invention and is directed to an embodiment for use with the laser printer shown in FIGS. 1a and 1b. A character generator 411 provides serial data signals to modulate the laser beam 17 to provide the desired characters or graphics. Data from the character generator 411 is provided to the laser drive circuitry 391 on the DC controller PCA 39.

The laser printer interface PCA 41 is controlled by CPU 413 which comprises a 16-bit microprocessor that executes programs stored in ROM 415. In addition to storing microprocessor controller programs to be executed in the CPU 413, the primary purpose of ROM 415 is to store the dot patterns or bit map images of the printer character sets or fonts. ROM 415 may also be utilized to store the template bit patterns in alternate embodiments where the template matching operation may be implemented as a table search or lookup operation controlled by software or firmware. The font cartridges 435, 437 comprise plug-in ROM cartridges which provide additional character set dot pattern data to the printer for different, optional fonts. Additional or optional matching templates for special fonts or customized effects may also be input to the character generator 411 and the enhancement circuitry 421 via optional font cartridges 435, 437. The font cartridge interface 439 buffers the main data bus 441 from the font cartridge 435, 437 connectors. Non-volatile random access memory (NVRAM) 419 is provided to store essential data such as printing data configuration and page count information entered via the control panel 413. Static random access memory (SRAM) 419 provides additional address space for the microprocessor in CPU 413. The address controller 423 outputs address information enabling access to the data stored in the four separate sections of the ROM 415. The address controller 423 is implemented as a single gate array circuit. An expandable dynamic random access memory (DRAM) 425 is provided to store printing information, font information and other information input from external devices 431. The microprocessor in the CPU 413 subdivides the DRAM memory space as required. The address controller 423 also outputs address information enabling access to data stored in the DRAM 425. The timing controller 429 generates the required timing signals when data is to be written or read from the DRAM 425 and also generates the data refresh signals for the DRAM 425. The bit shifter, 427 in response to the commands from the control panel 433 or the external devices 431, generates the necessary commands to offset or overlay printed characters and to shift data by 1 to 15 bits. The I/O controller 443 controls the timing of the data input from the external device 431 to the CPU 413 via parallel interface connector 445. The I/O controller 443 also controls the timing of communications between the interface PCA 41 and the DC controller PCA 39. The character generator 411 responsive to commands from the CPU 413 converts the bit map image data stored in the ROM 415 or the font cartridges 435, 437 to dot data which is continuously output to the laser drive circuitry 391 in the form of a serial data signal. The print enhancement circuitry 421 is interposed between the character generator 411 and the laser drive circuitry 391 to modify or compensate the serial data signal so that the print enhancement techniques may be carried out.

Figure 6B:
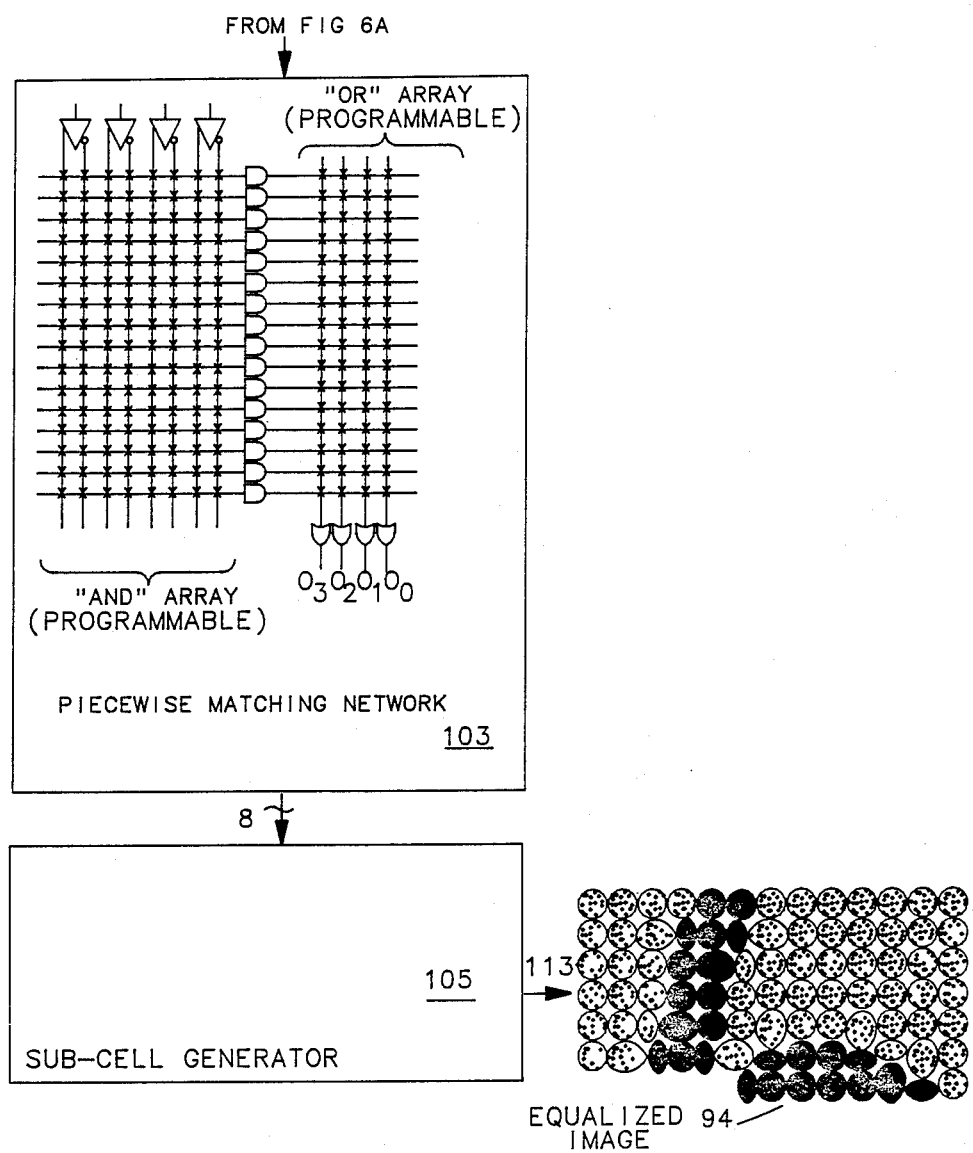

FIGS. 6a and 6b is a conceptual block diagram of the print enhancement circuitry 421. The data for a complete bit map image is serialized, the italic "b" 90 for example, and coupled to the first input of a "first- (7 in-first out" (FIFO) data buffer 101. The bit mapped image 90 is partially reassembled in the FIFO buffer 101. A fixed MxN subset 107 of the FIFO storage cells form a sample window 109 which views a block of the bit mapped image. As serialized data continues to shift through the FIFO buffer 101, the window 109 views successive center cells 111 and their surrounding neighbor cells.

Each bit of data will pass through the window 109 several times in different positions until it reaches the center cell 111 of the window. This center bit 111 along with its neighboring bit patterns, is viewed by the window 109 and passed through the matching network 103. The center bit 111 will be substituted for with an assigned compensation subcell if the matching network 103 finds a template match; otherwise, it will appear at the output 113 unchanged. The buffering introduces a $(N-1)\frac{1}{2}$ lines and a $(M-1)\frac{1}{2}$ bit delay from the time when a bit appears at the FIFO buffer 101 input until its associated compensation subcell appears at the output 113. The bit then remains in the FIFO buffer 101 for another $(N-1)\frac{1}{2}$ lines to serve as a neighboring cell for successive center bits 111 in the lines succeeding the bit.

The piece-wise matching logic network 103 is implemented in a programmable-logic-array (PLA). The PLA comprises an AND matrix, an OR matrix and a plurality of series of min-terms or nodes, with each series representing a different one of the matching templates. Each AND matrix input represents the state of a cell in the bit map sampling window 109. Each min-term represents a template bit or cell and will be active when matched by the corresponding sample window bit or cell (logic AND). All of the templates which are assigned the same compensation subcell are OR'd together. Thus, if any one template in the group matches with the input bit map pattern, (the sample window 109 bit pattern) the associated compensation subcell output will be activated (logic OR).

Since a particular compensation subcell is selected on the basis of the sampling window 109 cell states, a compensation subcell select signal is a su-of-products function. For each instance where a particular compensation subcell is required, a template is encoded as a product term of the sampling window 109 cell inputs and becomes a new independent min-term. The selection signal for a particular compensation subcell is formed by summing all of the product min-terms associated with that compensation subcell. Each node of the AND matrix can be connected (bit map pattern specified) or left open. Each min-term output can connect only to one or row (unique compensation subcell solution). The size of the sampling window 109 determines the dimension of the AND matrix. The number of templates determines the number of min-terms and the number of compensation subcells used determines the number of independent OR term outputs.

This matrix structure provides great flexibility as well as simplicity for template design. Very complex templates dependent on every bit cell in the sampling window 109 may be required to handle the exceptional cases. The PLA functions in a similar manner as a high speed parallel index matching table. The bit map pattern in the sampling window 109 is a set of complex input signals which promulgate through the PLA. The data path and thus the logic functions are determined by the node connections in the matching network 103.

The matching network 103 determines if, in order to reduce distortion in the original bit map image, the central cell 111 of the sampling window 109 will require correction. The central cell 111 of the sampling window 10 is therefore the "cell under test" and is being examined in context with the pattern formed by its neighboring sample window cell. The matching network 103 provides output signals that indicate what compensation subcell, if any, is required. As the data shifts through the FIFO buffer 101, the sampling window 109 views successive central cells 111 and their surrounding bit map pattern thereby individually testing each cell in the piece-wise matching network 103. The accumulative effect of the independent discreet cell compensation signals will be successions of joined compensation subcells which will smooth the discontinuous bit map image features into a closer approximation of the original analog continuous form. Because of the physical characteristics of the toner and fusing process, the final, enhanced printed image will very closely approximate the analog image.

The compensation subcell generator 105 is responsive to the matching network 103 output signals to provide the compensation signal associated with the particular compensation subcell selected by the matching network 103. If no compensation is required, the compensation subcell generator 105 will pass the unmodified state of the central cell 111 to its data output 113.

Figure 7:
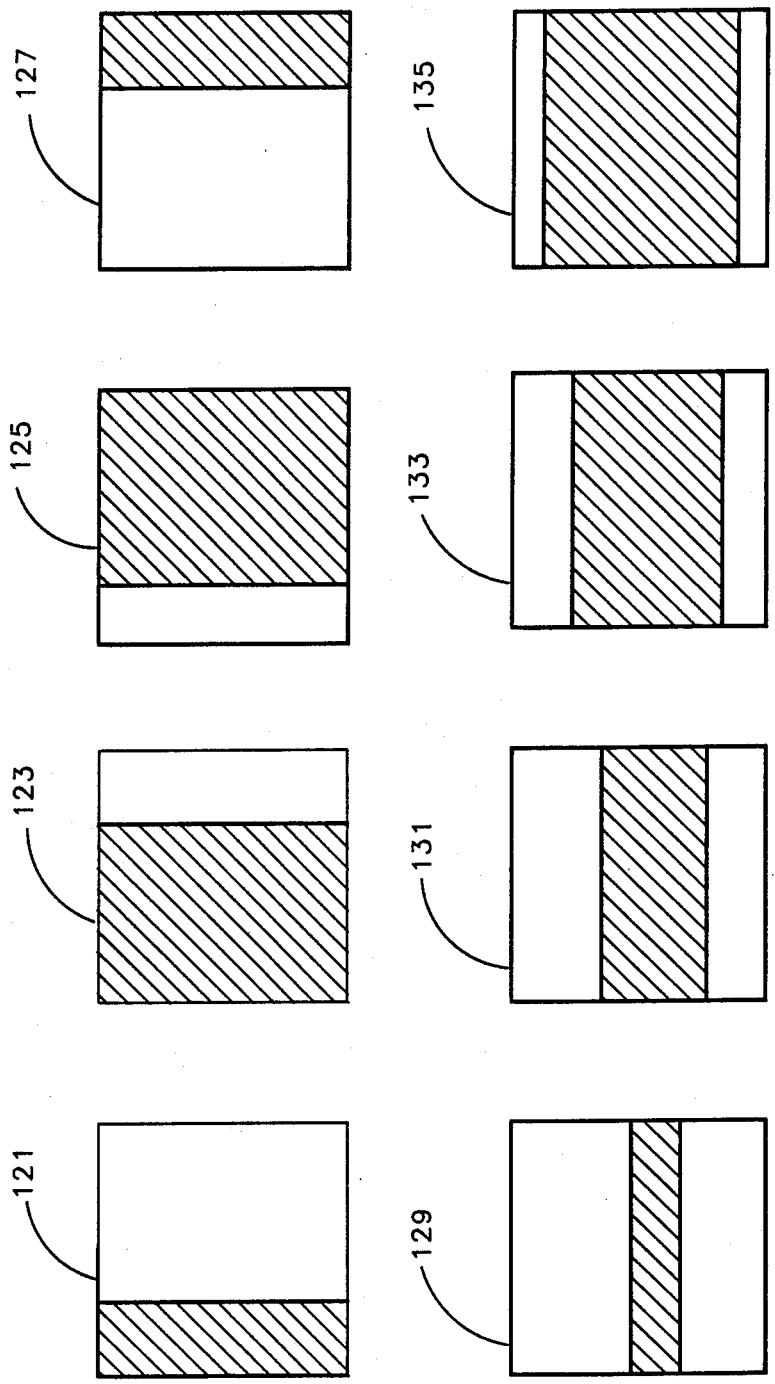
FIG. 7 is a block diagram representative of the laser modulation signals provided by the circuitry shown in FIG. 5.

In the preferred embodiment, eight different compensation subcells are used. The compensation subcells represented by diagrams 121 through 135 in FIG. 7, have parameters with values that fall between the incremental quantum values normally allowed for the unmodified bit map cell parameters. For example, to print a standard unmodified dot, the solid state laser 19 will be turned on for a specified length of time, 530 microseconds for example, while to print the compensation subcell represented by diagram 121 the laser 19 will be turned on only for the first $\frac{1}{3}$ of that time period and be off for the remainder of that time period resulting in a dot of approximately $\frac{1}{3}$ the size of unmodified dot. Reduction in cell size is normally accomplished by a increase in the bit map resolution and a higher resolution output mechanism is required to display them. Modulation of the laser 19 control signal allows a reduction in cell size to provide compensated subcells having a smaller size and selected portions of the bit map cells filled to provide predetermined shapes. Use of the compensation subcells result in an effective increase in bit map resolution in the immediate area of their use. The compensation subcell generator 105 provides the pulse modulation signals for the laser 19 that are required to print the compensation subcells shown in FIG. 7. The compensation subcells represented by diagrams 121 through 127 are produced by turning the laser 19 on for a period of time shorter than the standard dot time period as described above and ar utilized to provide corrections in the dimension parallel to the scan direction of the laser. The compensation subcells represented by diagrams 129 through 135 are produced by more complex laser modulation signals which effectively shift the toner density centerline in a dimension normal to the laser beam 17 scan dimension thereby providing compensating corrections in dimension perpendicular to the scan direction of the laser beam. By utilizing other horizontal and a vertical correction techniques on the laser beam printer, horizontal and vertical compensation subcells producing dots of smaller or different sizes then illustrated in FIG. 7 are possible. Different techniques may be used to achieve the same objectives on other image output devices.

In the preferred embodiment described herein, the FIFO buffer 101, the matching network 103 and the compensation subcell generator 105 are implemented in hardware and hard-wired logic circuits. The print enhancement circuitry 421 may, alternatively, be implemented in software or firmware having the template set and the associated compensation subcell set stored in RAM or ROM. When utilizing font scaling software programs to increase the physical size of a printed image, the effective resolution of a bit map image is reduced thereby increasing the digitization error effects. The matching templates may also be scaled to compensate for these errors and will provide enhanced print quality at scaling factors greater than 1.

Figure 8:
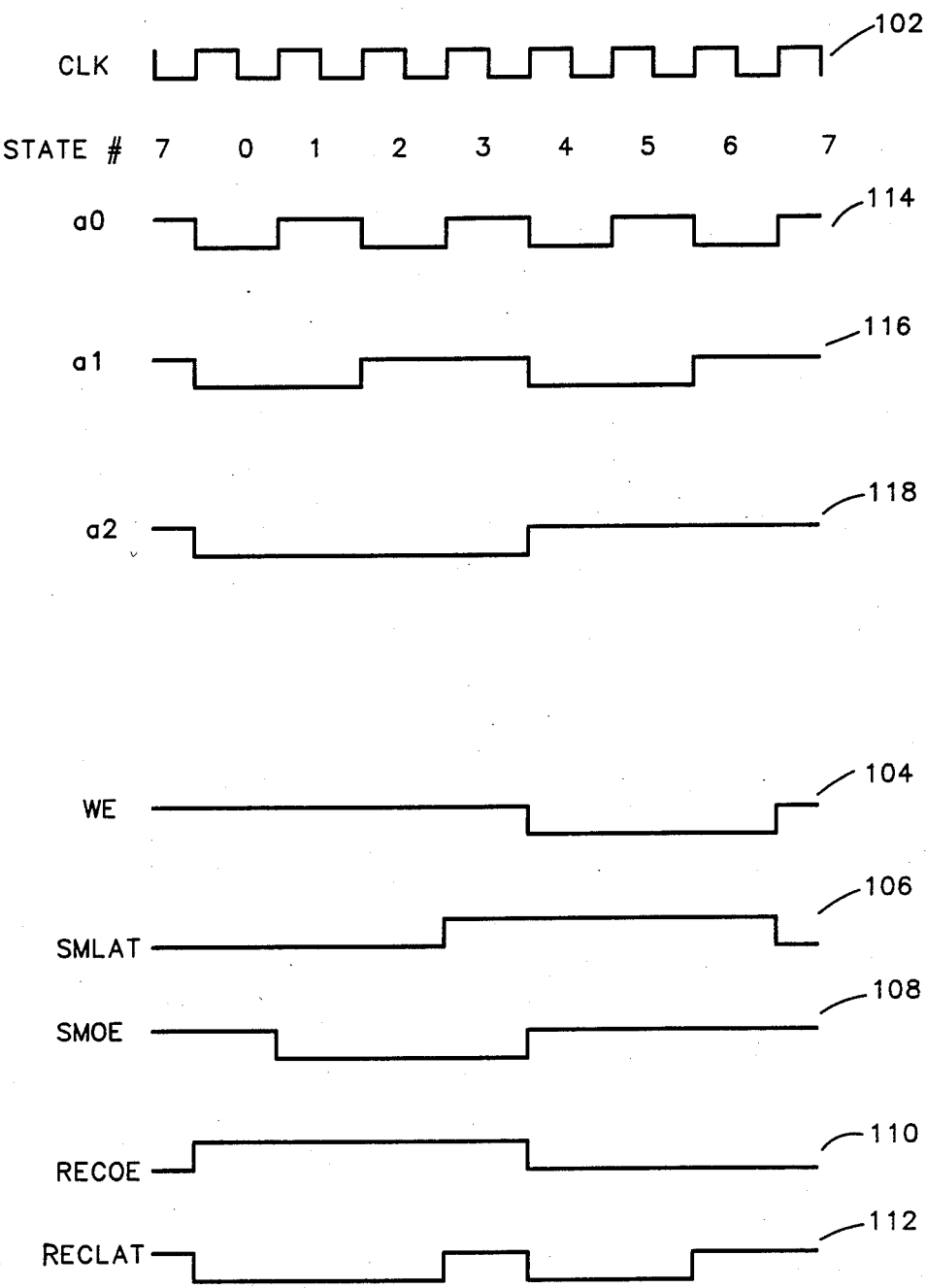
FIG. 8 is a timing diagram showing various timing signals utilized in the print enhancement circuitry of the present invention.
Figure 9A:
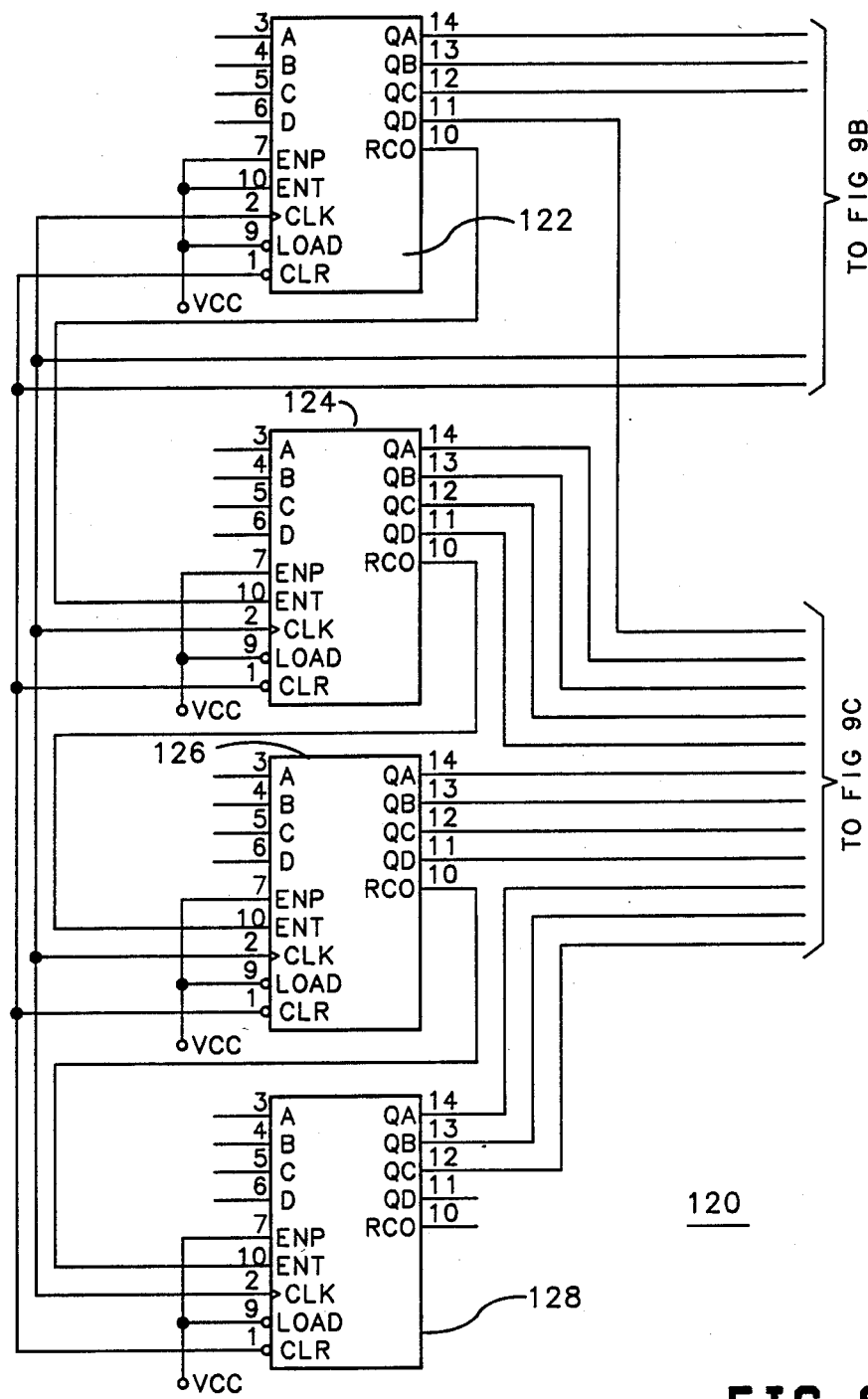
FIGS. 9a, 9b, 9c, 10a, 10b, 11a and 11b are a detailed circuit diagram of a preferred embodiment of the enhancement circuitry according to the present invention.
Figure 9B:
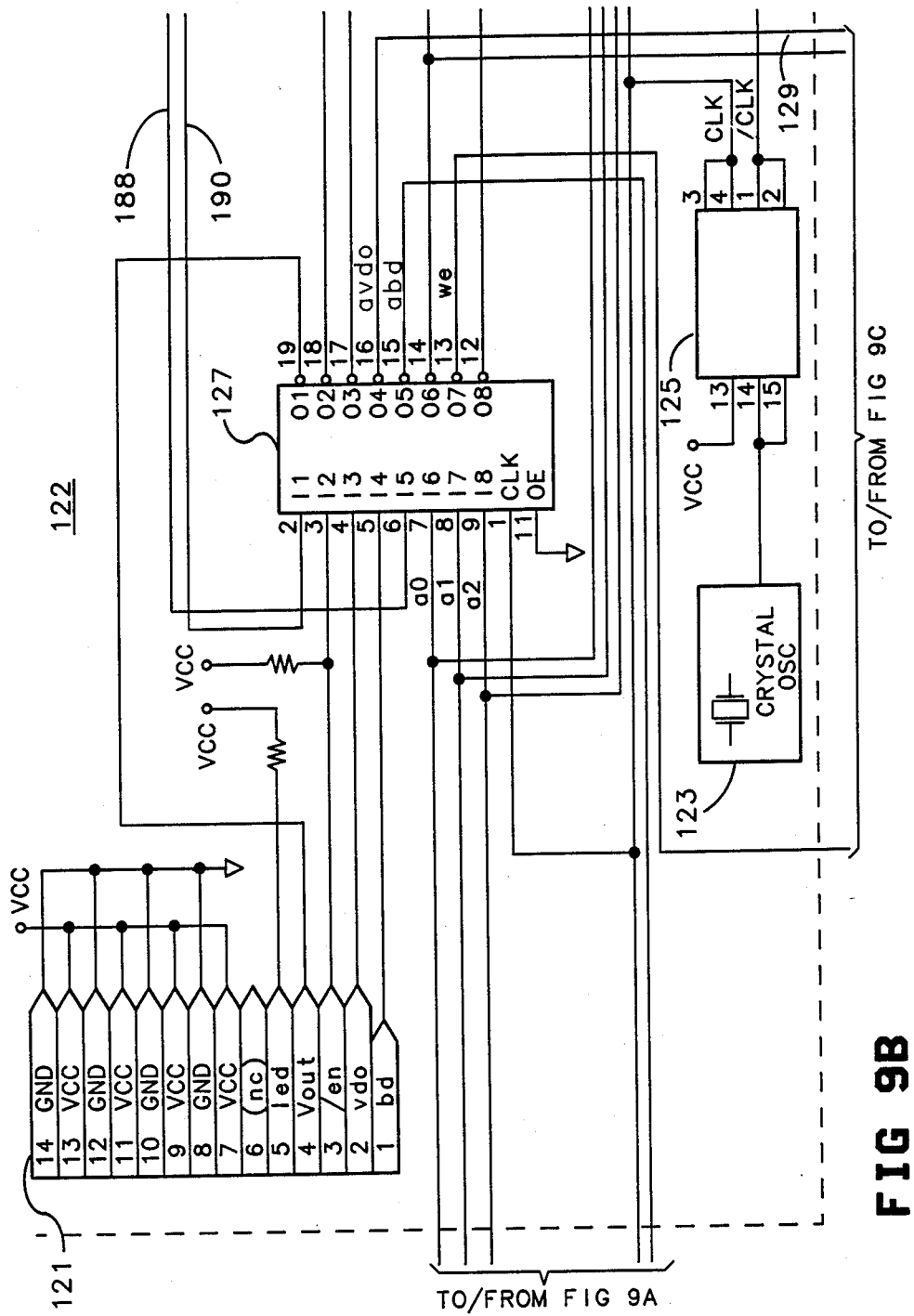
Figure 9C:
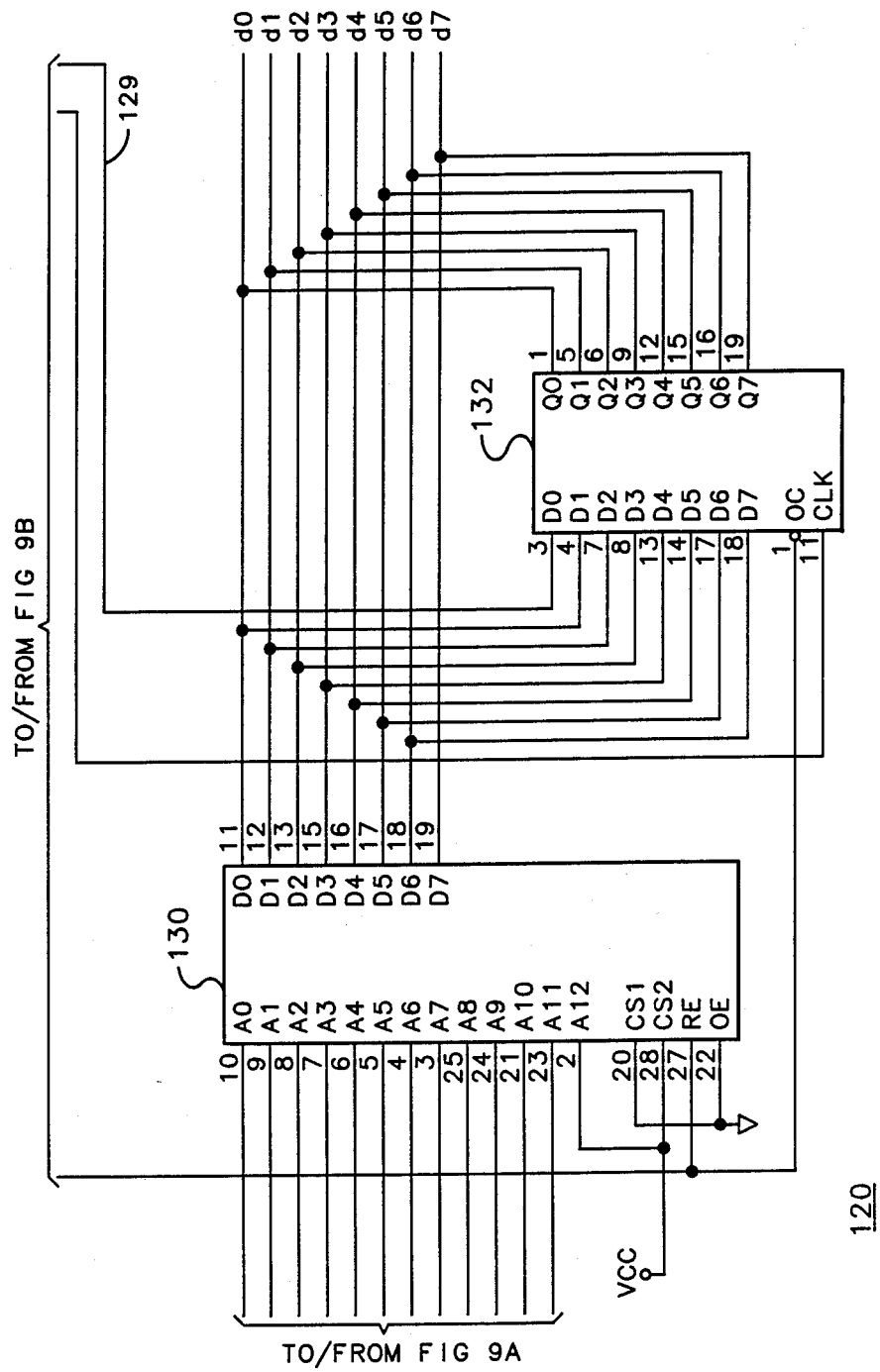
Figure 10A:
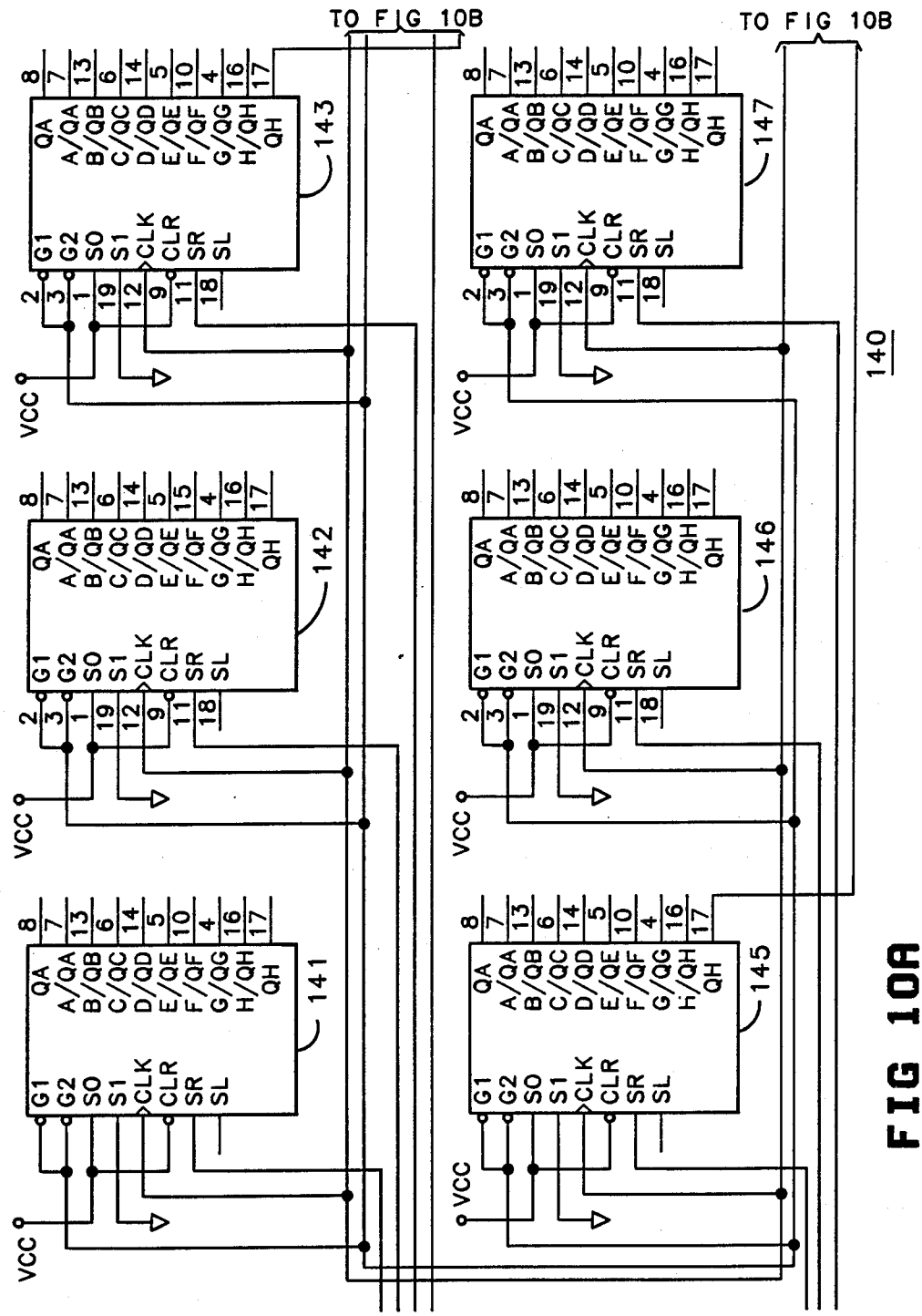
Figure 10B:
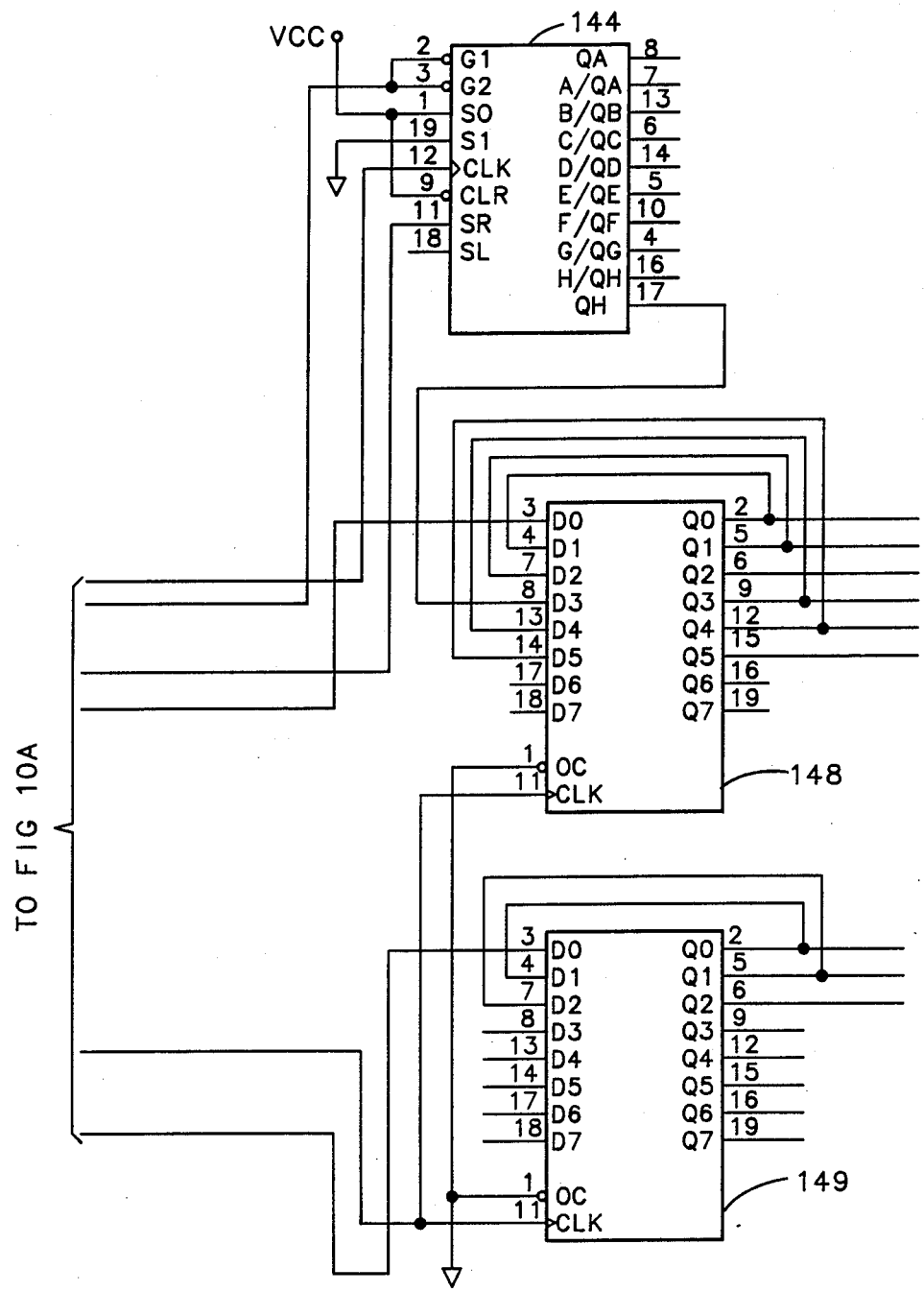
Figure 11A:
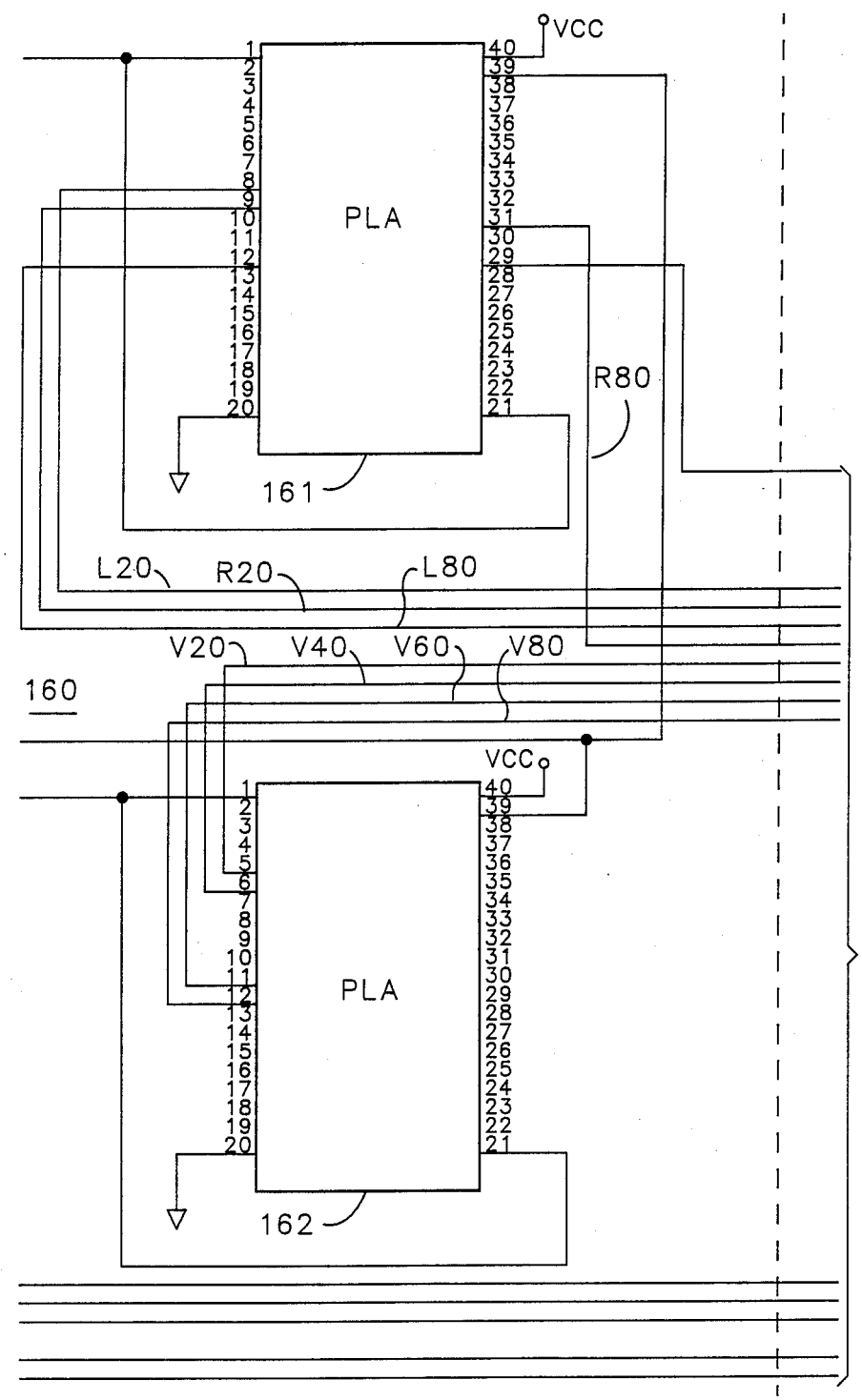
Figure 11B:
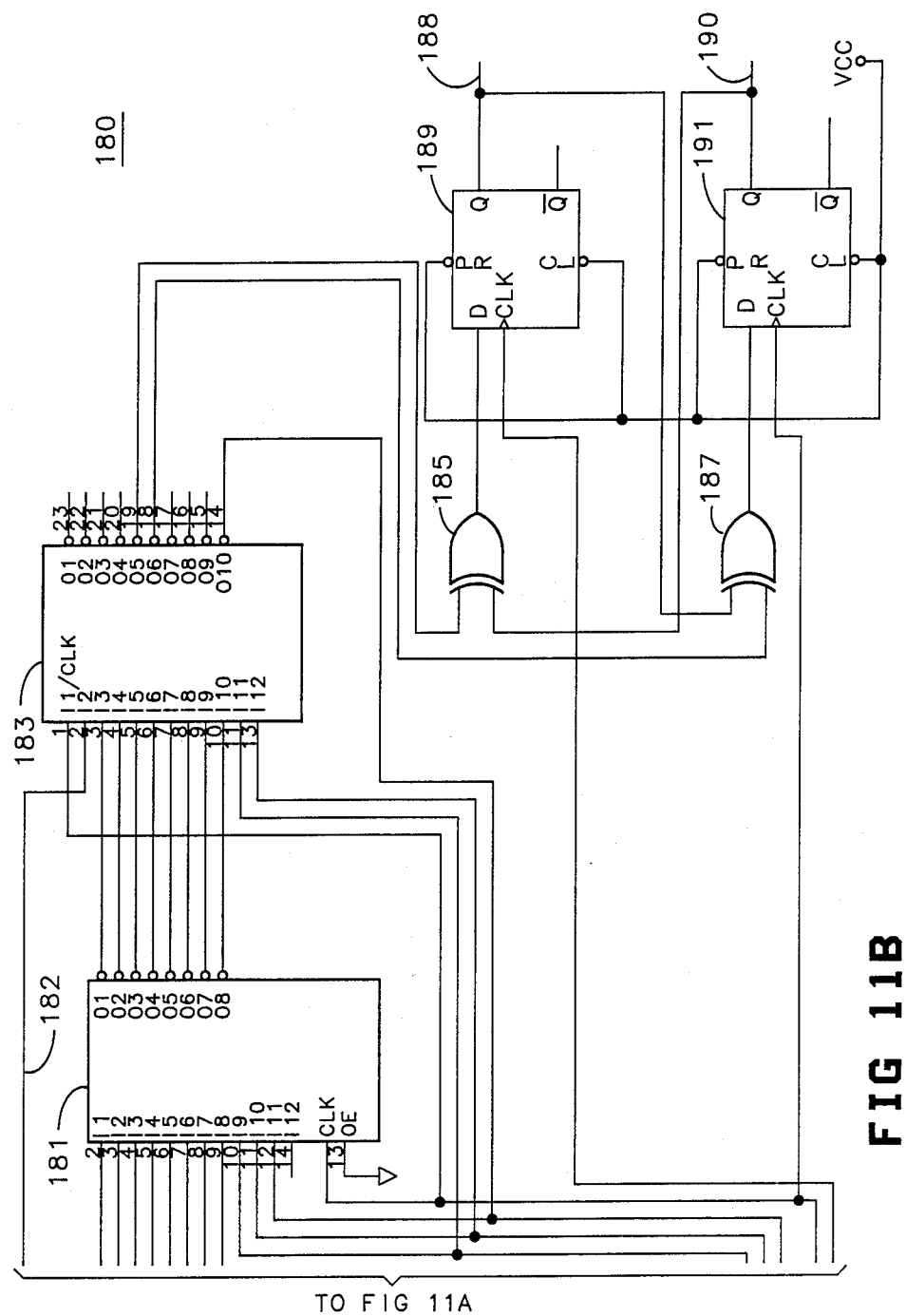

Referring now also to FIGS. 8, 9a, 9b, 9c, 10a 10b, 11a, and 11b, the enhancement circuitry 421 breaks down into five circuit blocks. The FIFO buffer 101 comprises a random access memory (RAM) buffer 120 shown in FIGS. 9a, 9b and 9c and a shift matrix 140 shown in FIGS. 10a and 10b. The piece-wise matching network 103 implemented as PLAs 160 and 162 and the compensation subcell generator 180 are shown in 11a and 11b Synchronization and system timing circuits 122 are also shown in FIG. 9. FIG. 8 is a timing diagram showing selected timing and synchronization signals utilized to control the enhancement circuitry 421 shown in FIGS. 9a, 9b, 9c, 10a, 10b, 11a and 11b.

The enhancement circuitry 421 is a post-processing circuitry block interposed between the character generator 411 and the laser drive circuitry 391 (as shown in FIG. 5). The enhancement circuitry 421 receives the serial bit data stream, VDO, representing dots to be printed on a page on pin 2 of terminal block 121 and a synchronization signal BD on pin 1 of terminal block 121. BD indicates the commencement of each horizontal scan line on the photosensitive drum which corresponds to a horizontal line on the page from the character generator 411. The enhancement circuitry 421 outputs a modified serial bit data stream signal, Vout on pin 4 of terminal block 121 to the laser drive circuitry 391. While the enhancement circuitry could take its clock signal from the character generator circuitry 411, in the preferred embodiment the timing clock is generated by crystal oscillator 123 and latch 125. Additionally a signal, EN, used to enable or disable the enhancement circuitry function is input to pin 3 of terminal block 121.

The RAM buffer block 120 consists of four counters 122, 124, 126 and 128, RAM 130 and octal D flip flop 132. The RAM buffer block performs the first internal function of the FIFO buffer 101 by storing the data representing successive dot lines on a page. The four counters 122, 124, 126 and 128 form an address counter for the RAM 130. The falling edge of BD indicates the start of a new line, so at that point the RAM address counter 122, 124, 126, 128 is reset by the synchronized beam detect signal from the timing PLA 127 which occurs on the falling edge of the BD signal. Since an input dot or cell data bit will occupy one bit in RAM 130, the RAM address is incremented once each dot time period. The system clock implements the counters 122, 124, 126 and 128 at eight times the incoming bit map data rate. The low three bits of counter 122 are not used for the address but are used for other system timing functions as will be discussed below.

When the RAM address increments, a new bit map data bit will be stored in memory. Referring to the system timing diagram, FIG. 8, the RAM 130 address will increment at the state 7-0 transition (the falling edge of clock signal 102). Since the RAM write enable signal 104, WE, is high, the RAM 130 will read out data. Octal D flip flop 132 has this data and the next successive (new dot data bit from VDO) on line 129 set up at its inputs. At the state 2-3 transition, the shift matrix latch signal 106, SMLAT, goes high and octal D flip flop stores the new data bit on line 129 and the RAM 130 data. During states 4, 5 and 6 WE 104 goes low and flip flop 132 outputs its stored data on lines D0 through D7, which is written to RAM 130 on the state 6-7 transition. Note from FIG. 9 that the new bit map data bit is stored in flip flop 132 position D0, while the previously values of D0, Dl, D2, D3, D4, D5 and D6 are stored in D1, D2, D3, D4, D5, D6, D7 respectively in the previous value of D7 is discarded. As the process repeats for each address increment, it can be seen that the current line (row) of bit map data being sent over VDO is buffered in the DO bits of the RAM 130 while the row previously in the DO bits is stored in the Dl bits, the row in the Dl bits move to the D2 bits, etc. Thus, the D1 through D7 bits hold the previous seven lines (rows) of bit map data in the storage of successive lines on a page is accomplished. For a given RAM 130 address, the eight bits (bit map data) stored all lay in the same column on a page. The RAM address reset with the falling edge of BD and increments once per dot time period. Data bits are sent from the character generator in the same manner; once per dot time period, starting at a predetermined time after the falling edge of BD. The RAM address is therefore a dot column address; the nth dot on a line will have tee same column address as the nth dot on any other line.

The shift matrix block 140 consists of shift registers 141 through 149. The function of the shift matrix block 140 is to make all of the data bits in the sampling window 109 (as shown in FIGS. 6a and 6b) available to the matching network PLAs 160, 162 simultaneously on parallel signal lines. In the preferred embodiment the sampling window consists of forty-nine cells or data bits and is shaped as shown in FIGS. 6a and 6b. The central 111 is the bit being examined for modification while the remaining forty-eight surrounding bits form the bit pattern to be matched with the template. Sampling window 109 includes up to eleven successive columns of bits from seven successive lines. The RAM buffer block 120 outputs only one column of bits from seven successive lines on lines D1 through D7 after each RAM address increment. Therefore, the shift matrix block 140 must store and simultaneously output bits from eleven successive RAM buffer column outputs.

On the state 7-0 transition, the RAM address counter increments and the bits output by RAM 130 on lines D1 through D7 are bits (bit map data) on seven successive lines (rows). D1 through D7 are input to D7 bit shift registers 141 through 147. D3, D4 and D5 each have an additional three-bit extension on their shift registers 143, 144 and 145 respectively which is coupled to shift registers 148 and 149. Shift registers 141 through 149 are simultaneously clocked on the state 2-3 transition by FMLAP 106 shifting the seven input bits into the shift registers 141 through 149. Subsequent address increments and register shifts every dot time period cause a shift registers parallel outputs to show successive bits in the row corresponding to its serial input. The shift matrix outputs (parallel shift register outputs) show successive columns of bits from the seven successive lines and the sample window 109 of bits to be examined in the matching network 103 is a subset of the parallel shift matrix output.

The sampling window 109 of bits output by the shift matrix block 140 scans across and down a page and every bit on the page is at the center of the sampling matrix for one dot period and is examined for possible modification.

The matching network block 160 consists of PLA networks 161 and 162 and performs the function of matching the bit patterns with the templates and, if a match is detected, providing a signal to generate the appropriate compensation subcell.

In the preferred embodiment there are eight possible output modifications (compensation subcells) for a bit, and each of these modifications has a corresponding set of combinations or recognitions patterns for the surrounding bit states. The PLAs 161 and 162 received the center bit (the center cell 111 as shown in FIGS. 6a and 6b and its surrounding bits from the shift matrix block 140. Each recognition pattern or template is detected by a product term in one of the PLAs 161, 162 and the set of product terms corresponding to a particular output bit modification (associated compensation subcell) are OR'd together. Thus any time the bit pattern in the sampling window output by the shift matrix 140 matches a template, a product term in one of the PLAs 161, 162 will become active and the corresponding OR output will go true, indicating which of the eight bit modifications to implement.

The PLAs 161, 162 utilized in the preferred embodiment for detecting recognition patterns have some physical limitations that are required to be compensated for. The maximum allowable number of inputs to each device is thirty-six and the maximum number of product terms (and thus recognition patterns) that can be OR'd together to select a bit modification is eight. However forty-nine bits must be examined to detect all of the recognition patterns, and the number of product terms that need to be OR'd together to select a possible bit modification may exceed twenty-four. This input number limitation is overcome by dividing the forty-nine bit sampling window 109 into two smaller windows that 110 together can detect all of the recognition patterns or templates. Twenty-four of the input pins on each PLA 161, 162 are actually in/out macrocell pins. Thus, the sample window inputs have to applied while the microcells latch the sum (OR) of the set product terms for each modification case and then the sample window inputs (shift matrix block 140 outputs) must be disabled while the microcells output the results. Since each macrocell output can only OR eight product terms, several macrocell outputs must be further OR'd in order to sum sufficient product terms (templates) to detect an output modification case.

During states 1, 2 and 3 the shift matrix output enable signal 108 (SMOE) is low enabling the shift matrix block 140 outputs from shift registers 141 through 149. The product terms in the PLA's 161, 162 detect any recognition patterns which are OR'd together in subsets of eight or less. These subsets are latched and microcells on the state 2 3 transition when the recognition latch signal 112 (RECLAT) goes high. During states 4, 5, 6 and 7 SMOE 108 is high, disabling the shift matrix block 140 outputs and the recognition output enable signal 110 (RECOE) is low thereby enabling the subset microcell outputs. These enabled microcell outputs now feed back into the PLAs acting as inputs. The subset microcells are OR'd in order to check the eight complete sets of recognitions patterns that detect the bit output modification cases. If a recognition pattern was detected, the corresponding bit modification case output goes active when RECLAT 112 again goes high on the state 5-6 transition. The eight possible bit modification case outputs on lines L20, R20, L80, R80, V20, V40, V60 and V80 correspond to the compensation subcells represented by diagrams 121 through 135 as shown in FIG. 7.

The compensation subcell generator block comprises octal D flip flop circuit 181, PLA 183, exclusive OR circuits 185 and 187 and D type flip flops 189 and 191. The compensation subcell generator provides the modified bit map data to the laser drive circuitry 391. If the center bit 111 and its surrounding bits in the sampling window 109 match a recognition pattern or template, the corresponding bit modification case output, lines L20 through V80, will be active and the compensation subcell generator will output a predetermined sixteen-bit pulse pattern corresponding to the specific compensation subcell selected by the matching network. If a match was undetected then lines L20 through V80 are all inactive and the center bit 111 will be coupled on line 182 to the output lines 188 and 190 unmodified, the laser will be on or off for an entire dot time period.

PLA 181 is programmed as an octal flip flop to hold the bit modification case outputs on lines L20 through V80 for an entire dot time period. It latches lines L20 through V80 on the state 7-0 transition, while the recognition PLA's 161, 162 outputs are still active.

Flip flop circuit 125 outputs the signals CLK and /CLK, true and inverted (bi-phase) clock signals having a 50% duty cycle. This clock signal is eight times the bit map data signal, VDO, rate. Utilizing the rising edges of both CLK, /CLK to change the circuit output state provides sixteen individual time periods per dot time period. The output signal on lines 188 and 190 comprise a duty cycle modulation signal for the laser, with each bit in the sixteen-bit output sequence controlled (high or low) by the logic equations implemented in PLA 183. PLA 183 outputs the bits for the output pulse pattern as selected by the states of, L20 through V80. The sixteen-bit pattern is output from the PLA 183 as eight successive pairs of successive bits, VDOA and VDOB respectably, i.e., VDOA and VDOB are output simultaneously, but VDOB is the value of the bit that follows VDOA. The state of a0, 114, a1, 116, and a2, 118, the three lower bits output by counter 122, indicate which pair of bits is to be output. The PLA 183 outputs VDOA and VDOB simultaneously at eight times the bit map data rate. The remainder of the circuit comprising exclusive OR gates 185, 187 and flip flops 189, 191 convert these outputs to the required output sequence running at sixteen times the bit map data rate.

After the rising edge of clock 102, data is set up at the input of the D type flip flop 189. The data is the VDOA (the next bit to be output on the rising edge of /CLK) PLA 183 output exclusive OR'd with the EVDOB signal, the output of flip flop 191 on line 190. This exclusive OR operation is an encoding of the data for gray code generation. The rising edge of /CLK latches this data at the flip flop 189 output on line 198, EVDOA signal. The EVDOA signal and EVDOB signal are exclusive OR'd (gray coding) in PT 127 to provide the next bit of the output signal Vout at pin 4 of terminal block 121. The flip flop 191 and the EVDOB signal on line 190 function in the same manner except the EVDOB is latched on the rising edge of CLK 102, to cause output of the following bit. The gray coding of the output bits insures that there will be no glitches on the output between any two successive bits of the same state.

PLA 127 is the synchronization and system timing circuit block that generates the timing signals shown on the system timing diagram and discussed above. The low three bits, a0, a1, a2, 114, 116, 118, respectfully, define the system timing states. Other functions of the synchronization and system timing circuit block 127 include synchronizing the incoming serial data signal, VDO, to compensate for phase differences between the character generator clock and the enhancement circuitry clock, oscillator circuit 123. When the EN input on pin 3 of terminal board 121 is high, Vout on pin 4 is equal to EVDOA exclusive OR'd with EVDOB as described above; when EN low, the enhancement function is disabled and the Vout is equal to VDO.

While the invention has been particularly shown and described with reference to a preferred embodiment thereof, it will be understood by those skilled in the art that the foregoing and other changes in form and details may be made therein without departing from the spirit and scope of the invention.

I claim:

1. A method for enhancing the displayed image of a display apparatus which produces a digitized image in a dot matrix format comprising the steps of:
   generating a bit data signal representative of at least one bit map image of a desired character;
   storing in temporary storage means N number of consecutive bits in M number of consecutive lines of said bit map image to form an M x N subset of the bits defining said bit map image;
   selecting a sample window having a predetermined shape and including a predetermined number of bits from said M x N subset of bits, said sample window having a central bit;
   comparing the sample window bit pattern formed by said predetermined number of bits including said central bit to a plurality of predetermined matching patterns of bits;
   generating a modification signal to modify said central bit if said sample window bit pattern matches at least one of said plurality of predetermined matching patterns; and
   substituting said modification signal for said central bit in said bit data signal.

2. The method of claim 1 further including the step of storing said plurality of predetermined matching patterns.

3. Apparatus for enhancing the displayed image produced by a display apparatus, said display apparatus including character generator means providing a bit data signal representative of a bit map image of a desired image and image display means responsive to said bit data signal to display said desired image, said apparatus comprising:
   temporary storage means coupled to said character generator temporarily storing portions of said bit data signal representing N number of consecutive bits in M number of consecutive lines of said bit map image forming an M x N subset of the bits defining said bit map image, a predetermined number of bits of said subset of bits forming a sample window having a predetermined shape defined by the matrix position of said bits, said sample window having a central bit;
   matching network means coupled to said temporary storage means for comparing the bit pattern formed by said central bit and the remaining, adjacent bits in said sample window with a plurality of predetermined error matching bit patterns, each of said matching bit patterns associated with one of a plurality of modification signals; and signal generating means coupled to said matching network means and to said image display means for generating an associated one of a plurality of predetermined modification signals if said sample window bit pattern matches at least one of said plurality of error matching bit patterns, said associated modification signal substituted for said central bit in said bit data signal, said image display means responsive to said modification signal to display a modified image element associated with said central bit.

4. Apparatus as in claim 3 further comprising storage means for storing said plurality of predetermined matching bit patterns.

5. Apparatus as in claim 3 wherein said associated modification signal comprises a modulation bit stream having a total time duration as that of an unmodified bit in said bit data signal, said modulation bit stream modulating said image display means during said unmodified bit time duration to produce said modified image element.

6. Apparatus as in claim 3 wherein said matching network means comprises a programed logic array.

7. An electrophotographic printing machine comprising:

rotatable drum means;

a layer of photoconductive material mounted on the surface of said rotatable drum means for cyclic movement through electrophotographic process stations;

charge corona means disposed adjacent said rotatable drum means for placing a substantially uniform electrostatic charge on the surface of said layer of photoconductive material;

exposure means for selectively discharging said charged photoconductive material to cause the formation of a latent image on the surface of said photoconductive material;

developer means disposed adjacent said rotatable drum means for applying toner to said latent image to produce a developed image;

transfer means disposed adjacent said rotatable drum means for transferring said developed image from said photoconductive material to a print media;

fusing means for fusing said toner to said print media;

paper transfer means for serially moving said print media from a media storage means through said transfer means to said fusing means;

control means for operating said exposure means;

character generator means coupled to said control means to provide data signals representative of a desired image to be produced on said photoconductive material; and enhancement means interposed between said control means and said character generator means for generating compensation signals to be substituted for selected ones of said data signals whereby an image produced from said substituted data signals is of an enhanced visual quality, said enhancement means comprising:

temporary storage means coupled to said character generator means temporarily storing portions of said data signals forming a sample pattern representative of a portion of said desired image, said sample pattern having a central data signal;

matching networks means coupled to said temporary storage means for comparing said sample pattern to a plurality of predetermined template patterns, each of said predetermined template patterns associated with one of a plurality of compensation signals; and signal generating means coupled to said matching network for generating said associated one of said plurality of compensation signals if said sample pattern matches at least one of said predetermined template patterns said associated compensation signal substituted for said central data signal in said data signals.

8. An electrophotographic printing machine as in claim 7 wherein said enhancement means further comprises storage means for storing said plurality of template patterns.

9. An electrophotographic printing machine as in claim 7 wherein said exposure means comprises a laser, said control means responsive to said data signals to generate laser drive signals turning said laser on and off to produce a modulated laser beam for selectively discharging said charged photoconductive material to cause the formation of said desired image, said control means responsive to said data signals to turn said laser on for a predetermined full signal time period, said control means responsive to said compensation signals to turn said laser on for a predetermined time period less than said full signal time period.

10. An electrophotographic printing machine as in claim 9 wherein each of said plurality of compensation signals comprises a different unique bit stream having a total time duration equal to said full signal time period and modulating said laser during said full signal time period to produce a desired compensation effect associated with said compensation signal.

11. An electrophotographic printing machine as in claim 7 wherein said temporary storage means comprises a plurality of clocked shift registers and counters defining a first-in-first-out data buffer.

12. An electrophotographic printing machine as in claim 7 wherein said matching network means comprises a programmed logic array for comparing said sample pattern to a plurality of predetermined template patterns.

* * * * *

UNITED STATES PATENT AND TRADEMARK OFFICE
CERTIFICATE OF CORRECTION

PATENT NO. : 4,847,641

DATED : July 11, 1989

INVENTOR(S) : Charles Cheng-Yuan Tung

It is certified that error appears in the above-identified patent and that said Letters Patent is hereby corrected as shown below:

Column 2, line 39, following "smoothing" insert --function, dots of an intermediate visual level such as--;

Column 11, line 62, delete " (7"; line 68, delete "l09" and insert --109--;

Column 12, line 12, delete both instances of "½" and substitute --/2--; line 16, delete "½" and substitute --/2--; line 35, revise "su-" to --sum---;

Column 13, line 49, delete "ar" and substitute --are--;

Column 14, line 17, insert --FIGS.-- before "11a";

Column 15, line 8, delete "D1" and substitute --D1--;

Column 16, line 38, delete "110", line numbering not part of patent text;

Column 17, line 60, delete "PT" and substitute --PLA--.

Signed and Sealed this

Twenty-second Day of January, 1991

Attest:

HARRY F. MANBECK, JR.

*Attesting Officer*   *Commissioner of Patents and Trademarks*